(12) United States Patent
Hueler

(10) Patent No.: US 8,762,182 B2
(45) Date of Patent: Jun. 24, 2014

(54) INDEPENDENT ANNUITY PLACEMENT SYSTEM AND METHOD

(75) Inventor: Kelli Hueler, Eden Prarie, MN (US)

(73) Assignee: Hueler Investment Services, Inc., Eden Prairie, MN (US)

( * ) Notice: Subject to any disclaimer, the term of this patent is extended or adjusted under 35 U.S.C. 154(b) by 48 days.

(21) Appl. No.: 12/692,731

(22) Filed: Jan. 25, 2010

(65) Prior Publication Data

US 2010/0121659 A1 May 13, 2010

Related U.S. Application Data

(62) Division of application No. 10/132,073, filed on Apr. 25, 2002, now Pat. No. 7,653,560.

(60) Provisional application No. 60/286,624, filed on Apr. 25, 2001.

(51) Int. Cl.
*G06Q 40/00* (2012.01)
(52) U.S. Cl.
USPC .................................. 705/4; 705/35
(58) Field of Classification Search
USPC .......................................... 705/4, 35
See application file for complete search history.

(56) References Cited

U.S. PATENT DOCUMENTS

| | | |
|---|---|---|
| 4,055,757 A | 10/1977 | Tillman et al. |
| 5,193,056 A | 3/1993 | Boes |
| 5,655,085 A | 8/1997 | Ryan et al. |
| 5,758,328 A | 5/1998 | Giovannoli |
| 5,802,493 A | 9/1998 | Sheflott et al. |
| 5,864,685 A | 1/1999 | Hagan |
| 5,987,434 A * | 11/1999 | Libman ................ 705/36 R |
| 6,055,517 A | 4/2000 | Friend et al. |
| 6,064,969 A | 5/2000 | Haskins |

(Continued)

FOREIGN PATENT DOCUMENTS

JP 2002297907 10/2002

OTHER PUBLICATIONS

May 3, 2011 File History for U.S. Appl. No. 10/132,073, 271 pages.

(Continued)

*Primary Examiner* — Sara C Hamilton
(74) *Attorney, Agent, or Firm* — Hollingsworth Davis, LLC

(57) ABSTRACT

A system and method for facilitating annuity transactions between annuity purchasers and providers via an annuities placement program accessible to the purchasers and providers. Purchasers enter quote solicitation information used by the annuity providers to establish a quote for an annuity. Annuity providers enter a quote in response to the quote solicitation information, and the quote is provided to the purchaser via the annuities placement program. The quote is customized to the annuity purchaser's quote solicitation information. Multiple quotes from multiple providers may be presented to the purchaser for ease of quote comparison. To facilitate such transactions, a discretionary group is established to be a contract holder for each participating annuity provider. A master group contract is established for each of the participating providers, each of which is written by a respective one of the participating annuity providers to the discretionary group to allow the discretionary group to be the contract holder for annuities purchased by the annuity purchasers. In response to an annuity purchase, a certificate of participation is issued to the purchaser from the provider under the terms of the master group contract of that annuity provider, which reflects annuity terms customized to the annuity purchaser.

10 Claims, 17 Drawing Sheets

(56) References Cited

U.S. PATENT DOCUMENTS

| | | | |
|---|---|---|---|
| 6,067,531 A | 5/2000 | Hoyt et al. | |
| 6,085,169 A | 7/2000 | Walker et al. | |
| 6,108,639 A | 8/2000 | Walker et al. | |
| 6,134,534 A | 10/2000 | Walker et al. | |
| 6,356,878 B1 | 3/2002 | Walker et al. | |
| 6,356,909 B1 | 3/2002 | Spencer | |
| 6,418,415 B1 | 7/2002 | Walker et al. | |
| 6,456,979 B1* | 9/2002 | Flagg | 705/4 |
| 6,466,919 B1 | 10/2002 | Walker et al. | |
| 6,473,737 B2 | 10/2002 | Burke | |
| 6,622,130 B1 | 9/2003 | Shepherd | |
| 6,684,189 B1 | 1/2004 | Ryan et al. | |
| 7,096,193 B1 | 8/2006 | Beaudoin et al. | |
| 7,143,051 B1 | 11/2006 | Hanby et al. | |
| 7,240,017 B2 | 7/2007 | Labelle et al. | |
| 7,343,309 B2 | 3/2008 | Ogawa et al. | |
| 7,454,379 B1 | 11/2008 | Wolzenski et al. | |
| 7,472,074 B1* | 12/2008 | Walker et al. | 705/26.82 |
| 7,653,560 B2 | 1/2010 | Hueler | |
| 7,711,599 B1* | 5/2010 | Libman | 705/14.17 |
| 2001/0023404 A1 | 9/2001 | Ogawa | |
| 2001/0042002 A1* | 11/2001 | Koopersmith | 705/10 |
| 2002/0010598 A1 | 1/2002 | Johnson et al. | |
| 2002/0010685 A1 | 1/2002 | Ashby | |
| 2002/0038281 A1 | 3/2002 | Lohman et al. | |
| 2002/0091613 A1 | 7/2002 | Kendall et al. | |
| 2002/0184129 A1 | 12/2002 | Arena et al. | |
| 2003/0105652 A1 | 6/2003 | Arena et al. | |
| 2005/0055299 A1 | 3/2005 | Chambers et al. | |
| 2010/0125465 A1 | 5/2010 | Hueler | |

OTHER PUBLICATIONS

Horn, "Accounting for Guaranteed Investment Contracts Will GAAP Follow the Regulatory Review", Bank Accounting and Finance, Winter 1996/1997, vol. 10,2, Banking Information Source, pp. 30.

Jahnke, "Your Name Here RFP engines hope to cash in on cobranding opportunities", Web Business Magazine, Mar. 2000.

Cahill et al., "Look to Annuities to Solve Pension Fears", Financial Executive, vol. 17,2,37, Mar. 2001.

Mitchell et al., "New Evidence on the Money s Worth of Individual Annuities", The American Economic Review, vol. 89, No. 5, Dec. 1999, pp. 1299-1318.

U.S. Office Action dated Sep. 13, 2007 for U.S. Appl. No. 10/132,073, 13 pages.

U.S. Office Action dated May 5, 2008 for U.S. Appl. No. 10/132,073, 17 pages.

U.S. Office Action dated Jan. 28, 2009 for U.S. Appl. No. 10/132,073, 19 pages.

File History for U.S. Appl. No. 12/692,753.

Bloomberg BNA, Group annuity contract held by trust as agent for natural persons is eligible for inside build-up tax deferral, Tax Management Memorandum, Washington: Jun. 19, 2000, vol. 41, iss. 13, p. 246 (2 pages).

* cited by examiner

FIG. 9

SELECT ANNUITY QUOTE REQUEST

1600

1602 username 04/18/2002 11:24:18 AM

Return Home

REVIEW QUOTE REQUEST

Record Keeper: Test Record Keeper
Company Name: Test Comapany
Illustration Name: username 04/18/2002 11:24:18 AM   — 1702

The annuitant has selected to receive quotes based on the following information:
Annuitant's date of birth: 04/11/1941
Annuitant's gender: M
Spouse's or Co-annuitant's date of birth:09/22/1941
Spouse's or Co-annuitant's gender:F
Percent of monthly income annuitant's spouse or co-annuitant would receive after annuitant's death: 66%
Annuitant's state of residence: MN
The deposit is coming from a 401(k)
The annuitant will be depositing: $ 100,000
Estimated deposit date: 05/03/2002
The annuitant would like to begin receiving payments on: 06/01/2002   — 1704

Issuer Information
Issuer Company Name:       Issuer01
Moody's Rating:            Aaa
S&P Rating:                AAA
AM Best Rating:            A++   — 1708

Enter Quote monthly income for 10 Year Term Certain with Lifetime Income: [633]
Enter Quote monthly income for inflation protection 10 Year Term Certain with Lifetime Income: [600]   1712  — 1710
Enter Baseline Quote monthly income for Life Only:  —1714  [655]   — 1706

Submit Quote | Return Home

*FIG. 17*

CONFIRM SELECTION

You have selected to purchase an annuity based on the following information:

Your date of birth: 04/11/1941
Your gender: M
Spouse's or Co-annuitant's date of birth: 09/22/1941
Spouse's or Co-annuitant's gender: F
Percent of your monthly income your spouse or co-annuitant would receive after your death: 66%
State of residence: MN
Your deposit will be coming from a 401(k)
You will be depositing: $ 100,000
Your quote was based on an estimated deposit date of: 05/03/2002.
You selected to begin receiving payments on: 06/01/2002

You have selected to purchase the following Immediate Annuity:
10 Year Term Certain with Lifetime Income annuity.
Issuing Company: Issuer01
Moody's Credit Rating: Aaa
S&P Credit Rating: AAA
A.M. Best Credit Rating: A++
Monthly Income: $ 633
Please enter your name as you want it to appear on your annuity.
First Name: John     Middle Initial: Q     Last Name: Public
Daytime phone number: 952-941-5351
Please re-enter your lump sum deposit amount. $ 100000
Please enter your mailing address (No P.O. Boxes)
Street Address: 10400 Viking Drive City: Eden Prairie     State of residence: Minnesota     Zip Code: 55038

When you click on the purchase button below, you are making a final decision to purchase an annuity contract from Issuer01. This purchase can not be cancelled or refunded at any time in the future.

[Print Selection]  [Purchase]

PURCHASE CONFIRMATION

You have purchased an annuity from Issuer01. If you have any questions or need assistance completing the following steps, please call 1-800-555-1212 and a Issuer01 representative will be happy to assist you. } 2202

You have purchased an annuity from Issuer01. Please complete the following steps.
1. Print this page. [Print]
2. Sign and date the form. If applicable, co-annuitant must also sign the form.
3. Fax a signed copy to Issuer01 at 1-800-111-1111. Or you can mail a copy to Issuer01 at 1 Main Streeet, Suite 1, Issuer 1 City, NY, 10001-1111.
4. Submit a signed copy to your benefits department or plan administrator to proceed with processing your withdrawal.
} 2204

John Q Public
Daytime Phone Number: 952-941-5351
Mailing Address:
10400 Viking Drive Eden Prairie, MN 55344

You have selected to purchase:
10 Year Term Certain with Lifetime Income annuity with an annual step increase of 2%.
Your date of birth: 04/11/1941
Your gender: M
Spouse's or Co-annuitant's date of birth: 09/22/1941
Spouse's or Co-annuitant's gender: F
Percent of your monthly income your spouse or co-annuitant would receive after your death: 66%
State of residence: MN
Your deposit will be coming from a 401(k)
You will be depositing: $ 100,000
Your quote was based on an estimated deposit date of: 05/03/2002
You selected to begin receiving payments on: 06/01/2002

You have selected the following winning quote:
Issuing Company: Issuer01
Moody's Credit Rating: Aaa
S&P Credit Rating: AAA
A.M. Best Credit Rating: A++
Monthly Income: $ 633

_____    _____
Annuitant Signature         Date
                                                  } 2206
_____    _____
Co-annuitant Signature    Date

[Return Home]

INDEPENDENT ANNUITY PLACEMENT SYSTEM AND METHOD

RELATED APPLICATIONS

This application is a divisional of U.S. application Ser. No. 10/132,073, filed on Apr. 25, 2002 now U.S. Pat. No. 7,653,560, which claims the benefit of U.S. Provisional Application No. 60/286,624, filed Apr. 25, 2001, both of which are hereby incorporated herein by reference in their entireties.

FIELD OF THE INVENTION

The present invention relates generally to financial transaction processing, and more particularly, to a system and method for facilitating an individual's solicitation and receipt of quotes for annuities, and ultimate purchase of annuities at institutional prices.

BACKGROUND OF THE INVENTION

The financial industry provides a multitude of investment options for investors to manage and grow their financial resources. The different types and vehicles of investment continues to increase. With all of the different options available, individual investors often turn to managed plans or otherwise seek professional investment advice to help simplify investment decisions. In the workplace, companies and employers often provide ways to allow employees to invest a portion of their income, such as through a 401(k) program, which is an investment vehicle facilitated by the tax code.

Plan sponsors have done an excellent job of encouraging broad-based employee participation in corporate retirement plans through careful plan design and effective communication of plan benefits. They have also dedicated a significant amount of time and resources to investment education for employees. The results of these efforts are impressive. Participation has increased over the years and studies show us that employees have begun to adopt asset allocation strategies reflecting a longer-term higher risk profile, which for many employees is essential to achieving financial security in retirement.

However, little has been done for the employee who is reaching or has reached the end of his or her earning years, and therefore, has a significantly different time horizon and risk profile. Because the demographics have shifted dramatically over the last five years and millions of employees will soon be facing a life changing transition, there is a heightened awareness and concern about preparing employees for what lies ahead. How these "transitioning employees" fare after successfully accumulating a nest egg and subsequently leaving the plan will be a critical issue in the ongoing debate about the ultimate success of the private versus public retirement system. This group of employees has a unique set of concerns and investment objectives and a considerably shorter time horizon for their investments to remain undisturbed. Many individuals are seeking to create or replace a predictable income stream, and while return is very important, preserving principal is critical. Upon departure from the plan, the transitioning employee often faces a near term need for income and in today's market has difficulty obtaining competitive, conservative investment products. Some of these individuals also have a need for continued tax deferral and, due to a longer life expectancy, must continue to seek a combination of income producing and equity investments. For all transitioning employees, maximizing the return or income from their conservative investments is imperative. Strong returns create a higher level of current income making the need to redeem principal less likely, hence keeping their nest egg in tact. Tax deferral is also an ongoing concern, as individuals look to pay taxes on the income used versus what their investments may earn.

The corporate plan sponsor has traditionally provided annuities to employees as part of the defined benefit program. In general, an annuity is a series of payments of set size and frequency, often to a retired person (although this need not be the case). More particularly, an annuity is a contract sold by an issuer such as an insurance company, which is designed to provide payments to the annuity holder at specified intervals. Annuities are relatively safe investments, and the capital in annuities grows tax-deferred. Annuities are purchased for plan participants, for example, upon retirement, departure from the plan, or when a defined benefit plan is terminated. Defined benefit disbursements are technically a company provided benefit funded and distributed by the corporation. Many corporate plan sponsors offer an annuity option to employees versus a lump sum cash payment of their account balance.

While a number of plan sponsors provide for an annuity placement option in their 401(k) or other "qualified" retirement plans, few companies actually have a program in place giving plan participants the opportunity to purchase an annuity. Therefore, while annuities have long been an excellent way of providing individuals the means to create a predictable income stream and earn interest on a tax-deferred basis, competitive pricing has always been an issue for both institutional and retail products. The internal costs and distribution fees associated with retail annuity products are prohibitive and significantly diminish the income benefits to investors. While group or institutional annuity pricing is substantially better than retail, the process used by institutions to obtain group annuity contracts leaves substantial room for improvement.

Historically, because group annuities were funded by the corporation as a pension benefit, the corporate sponsor selected the issuing insurance company and the type of contract offered to employees. Contracts offered were generally designed to replace an employee's income stream that had accrued to them under the terms of the corporate pension plan, or to convert a lump sum balance to a specified income stream. The placement of group annuity contracts has traditionally been handled through the Human Resources department, rather than the pension investment group. This has caused annuities to be treated like a benefit rather than the investment that they are. Most often the business was awarded to one or more insurance companies based on previous or existing benefit provider relationships.

Due to constraints on time and resources, plan sponsors have focused on obtaining arrangements with a limited number of carriers that fix the contract expenses and promise the best possible pricing at the time of the quote request. The plan sponsors have believed that the insurance companies are giving them a significant pricing benefit. Insurance companies have encouraged this type of arrangement, because this way it is basically guaranteed that they will receive a portion of what ever business is placed.

On the surface this arrangement looks fair, because plan sponsors are getting generous concessions on the "costs" that are disclosed to them, and the assumption is that these costs are significant. Unfortunately, it is the costs that the plan sponsor does not see that have a significant affect on pricing. In fact, contract expenses are only a minimal factor in determining price relative to other constraints that actually drive pricing and make up the bulk of the cost to buyers. The driving force behind pricing stems from a number of issues, such as an issuer's own current book of business, asset pool, risk assumptions and internal economic outlook. At any time, an issuer's best possible offer may be substantially below the market, resulting in a significant discrepancy from one issuer's quote to the next.

Even with a competitive bidding session where issuers are forced to use the broader market as their bogie for pricing, equivalent or better credits can exceed peer pricing by 4% to 12%. When a competitive bidding session is not used, the pricing differential can more than double. For plan sponsors that are terminating pension liabilities, this equates to substantial increases in the cost to fund a group annuity contract. For employees who are trying to establish a monthly benefit, this causes a significant reduction in income. Either way the result is less than optimal.

In addition there is another hidden cost driver of which buyers may be unaware. Annuities are priced one of two ways. They are either sold on an institutional (group) basis, or on a retail (individual) basis. Retail annuities carry significantly higher commissions, as they are sold individually. Group annuities have far lower sales charges associated with them because they are sold in volume. However, that is only one of the pricing disadvantages to retail annuity products. There is actually a pricing disadvantage that occurs internally, due to risk charges, before any commissions are added. The retail annuity is often priced using a different set of internal risk assumptions creating higher risk assumptions for different lines of business from the onset, prior to the addition of any sales charges or commissions. So the very same product when sold to an individual within a group can be significantly less expensive than when sold to an individual alone, even before retail or distribution costs are added on. This affects the retail investor with an additive effect, thereby significantly diminishing the retail investor's monthly income from any annuity product purchased apart from a group.

A problem plan sponsors and other fiduciaries face is that carrying out a manual competitive bidding process amongst a diverse group of insurance companies would require time, knowledge, and resources that most companies do not have within their human resources staff. The typical process lacks several important elements: objectivity (deals are typically relationship-driven), a comprehensive search (minimal number of providers providing quotes), and competitive pricing (no real competition due to too few providers), and no system to handle the information flow involved in a robust quote process. As a result, when a corporate plan sponsor determines that more expertise or resources are needed to handle the annuity placement process, they generally outsource the effort with, for example, a financial advisor or benefits consultant.

When the life insurance industry began to experience deterioration and eventually insolvencies, plan sponsor and regulator concerns started to emerge. The environment shifted drastically in 1995 when the Department of Labor (DOL) issued its interpretive bulletin 95-1 addressing fiduciary responsibility in selecting an annuity provider for the purpose of distributing benefits from an employer sponsored pension plan. This bulletin clarified that an objective, thorough, and analytical search for annuity providers was required to meet the fiduciary obligation of plan sponsors under the Employee Retirement Income Security Act (ERISA). It also addresses the issues of conflict of interest and independent expert advice. This was an important clarification by the DOL on fiduciary duty, as it relates to annuity selection. This has resulted in raising the bar for plan sponsors and other fiduciaries, relative to the annuity selection and purchase process.

Another problem facing the insurance/annuity industry deals with the general availability of annuities to individuals, even where those individuals are involved with a defined benefit plan provided by their employers or other plan sponsor. Presently, insurance companies generally write group contracts for facilitating annuity purchases by plan participants to the corporate plan sponsor or to an agent of the plan appointed by the plan. A plan that can offer group annuities to its participants must have language in the plan document that allows for this distribution option. Historically all pension funds (defined benefit plans) allowed for this option, and plan sponsors were inclined to also provide it in their 401(k) plans. The majority of group annuity contracts were written to defined benefit plans.

In the mid-nineties, around the time the Department of Labor (DOL) issued 95-1, the thinking began to shift. Plan sponsors began to eliminate the annuity option from their existing defined contribution plans, and it was seldom included in any new plan creation. Corporate plan sponsors had several problems with providing the option. Complying with the DOL guidelines for annuity selection meant increased time, high-level administration, and increased fiduciary liability for the plan sponsors. Plan sponsors felt that if the process did not comply with 95-1 and was not fully documented to prove it, the company could be exposed to significant future liability. Additionally, in order to actually comply with 95-1, plan sponsors had to move away from the common practice of allowing the insurance company(s) in which they did the most business with handle the annuity requests by participants, with little concern for competitive pricing, etc. As a result, only an estimated 20% of current defined contribution plans still have an annuity option, and plan consultants firmly discourage any sponsor from including such an option.

This being the case, insurance companies have seen their group annuity business dwindle. And, with the markets performing as they had through the latter half of the nineties, little has been done by insurance companies to try to find new avenues for offering group annuities. Generally insurance company contracts were designed to be written to plan sponsors or agents of the plan, and additionally, group annuity contracts are written to plans that offer the annuity option for distributions for which the vast majority of plans no longer offer such an option.

Therefore, a need exists in the financial industry to provide a manner in which all individuals have access to annuities at group/institutional rates rather than at individual retail rates, even if the individuals' plan sponsors do not provide an annuity option in their plans. A further need exists to facilitate such transactions between annuity seekers and the various annuity providers, without requiring plan sponsors to assume the costs and liabilities that may accompany annuity contracts. The Income Solutions model of the present invention makes it possible for any plan sponsor or fiduciary of any size to cost-effectively implement an acceptable annuity selection process, while ensuring optimum, institutional pricing for the individual investor. The Income Solutions platform of the present invention also facilitates annuity purchases for both defined-benefit and defined-contribution plan participants. The present invention further provides a solution to the limited annuity availability problem that is plaguing the annuity industry, by facilitating group contract creation without shifting the cost and liability burden to plan sponsors. The present invention thus provides solutions to the shortcomings of the prior art, and provides numerous advantages over prior art annuity management methodologies.

SUMMARY OF THE INVENTION

The present invention is directed to a system and method for facilitating an individual's solicitation and receipt of quotes for annuities, and ultimate purchase of annuities at institutional prices, and for establishing the platform that facilitates such annuity purchases by individuals.

In accordance with one embodiment of the invention, a method is provided for facilitating annuity transactions between annuity purchasers and annuity providers via an annuities placement program accessible to the annuity purchasers and providers. The method includes facilitating annuity purchaser entry of quote solicitation information used by the annuity providers to establish a quote for an annuity, and providing the quote solicitation information to at least one, but preferably multiple annuity providers via the annuities placement program. The method includes facilitating annuity provider entry of at least one quote in response to the provided quote solicitation information, and providing the quote to the annuity purchaser via the annuities placement program wherein the provided quote is customized to the annuity purchaser's quote solicitation information. The quotes from a plurality of the annuity providers are presented to the annuity purchaser in a manner conducive to comparison of the quotes by the annuity purchaser. The method further includes facilitation of the selection of a quote by the annuity purchaser. In this manner, the annuity provider quote is customized to the individual request, and it is a quote that can actually be purchased by the annuity purchaser in the form that it was requested, all without the need for intermediary intervention.

In accordance with a more particular embodiment of the method is provided for facilitating annuity transactions between annuity purchasers and annuity providers via an annuities placement program, a discretionary group is established to be a contract holder for each participating annuity provider. This more particular embodiment further includes establishing a master group contract for each of the participating annuity providers, wherein each of the master group contracts are written by a respective one of the participating annuity providers to the discretionary group to allow the discretionary group to be the contract holder for annuities purchased by the annuity purchasers. In response to a purchase of an annuity by the annuity purchaser, a certificate of participation is issued to the annuity purchaser from the annuity provider under the terms of the master group contract of that annuity provider, and reflecting annuity terms customized to the annuity purchaser. In a more particular embodiment, an annuity purchaser's qualified plan-sponsored retirement accounts are converted to a contribution type that is available for annuity investment sponsored by the discretionary group.

In accordance with another embodiment of the invention, a method and corresponding system is provided for facilitating annuity contract quoting between annuity purchasers and annuity providers. This includes creating, by at least one annuity purchaser, an electronic annuity quote invitation, and electronically dispatching the electronic annuity quote invitation to designated annuity providers to prompt the designated annuity providers to furnish the annuity quote. Electronic annuity quote responses are submitted, by the designated annuity providers, to the annuity purchaser in response to the electronic annuity quote invitation. A most favorable electronic annuity quote response is identified by the annuity purchaser, and the annuity provider who submitted the most favorable annuity quote response is notified that the annuity purchaser is requesting to purchase an annuity with the annuity provider at terms substantially defined by the annuity quote response.

In accordance with another embodiment of the invention, a method is provided for facilitating pervasive availability of institutionally priced annuities for individual annuity purchasers. The method includes establishing a discretionary group to be a contract holder for each participating annuity provider, and establishing a master group contract for each of the participating annuity providers, wherein each of the master group contracts are written by a respective one of the participating annuity providers to the discretionary group to allow the discretionary group to be the contract holder for annuities purchased by the annuity purchasers. In response to a purchase of an annuity by the annuity purchaser, a certificate of participation is issued to the annuity purchaser from the annuity provider under the terms of the master group contract of that annuity provider, and reflecting annuity terms customized to the annuity purchaser. Further, an annuity purchaser's qualified plan-sponsored retirement accounts may be converted to a contribution type that is available for annuity investment sponsored by the discretionary group.

BRIEF DESCRIPTION OF THE DRAWINGS

FIG. 9 illustrates an exemplary user interface screen from which the potential annuity purchaser can calculate estimated monthly income based on a proposed investment amount, or the estimated one-time payment required to obtain a desired monthly income;

FIG. 15 is an exemplary embodiment of a main user interface page from which annuity providers access quote solicitations, purchased annuities, status, and the like;

FIG. 16 illustrates an exemplary annuity quote request screen identifying pending quote requests;

FIG. 17 is an exemplary embodiment of a quote management screen which allows annuity providers to review quote solicitations and provide annuity quotes in response thereto;

FIG. 21 illustrates an exemplary confirmation screen which allows the annuity purchaser to confirm and add additional information to the quote selection;

FIG. 22 illustrates an exemplary purchase confirmation screen that confirms the annuity purchaser's annuity purchase and facilitates generation of additional contract documentation.

DETAILED DESCRIPTION OF THE ILLUSTRATED EMBODIMENTS

Figure 1:
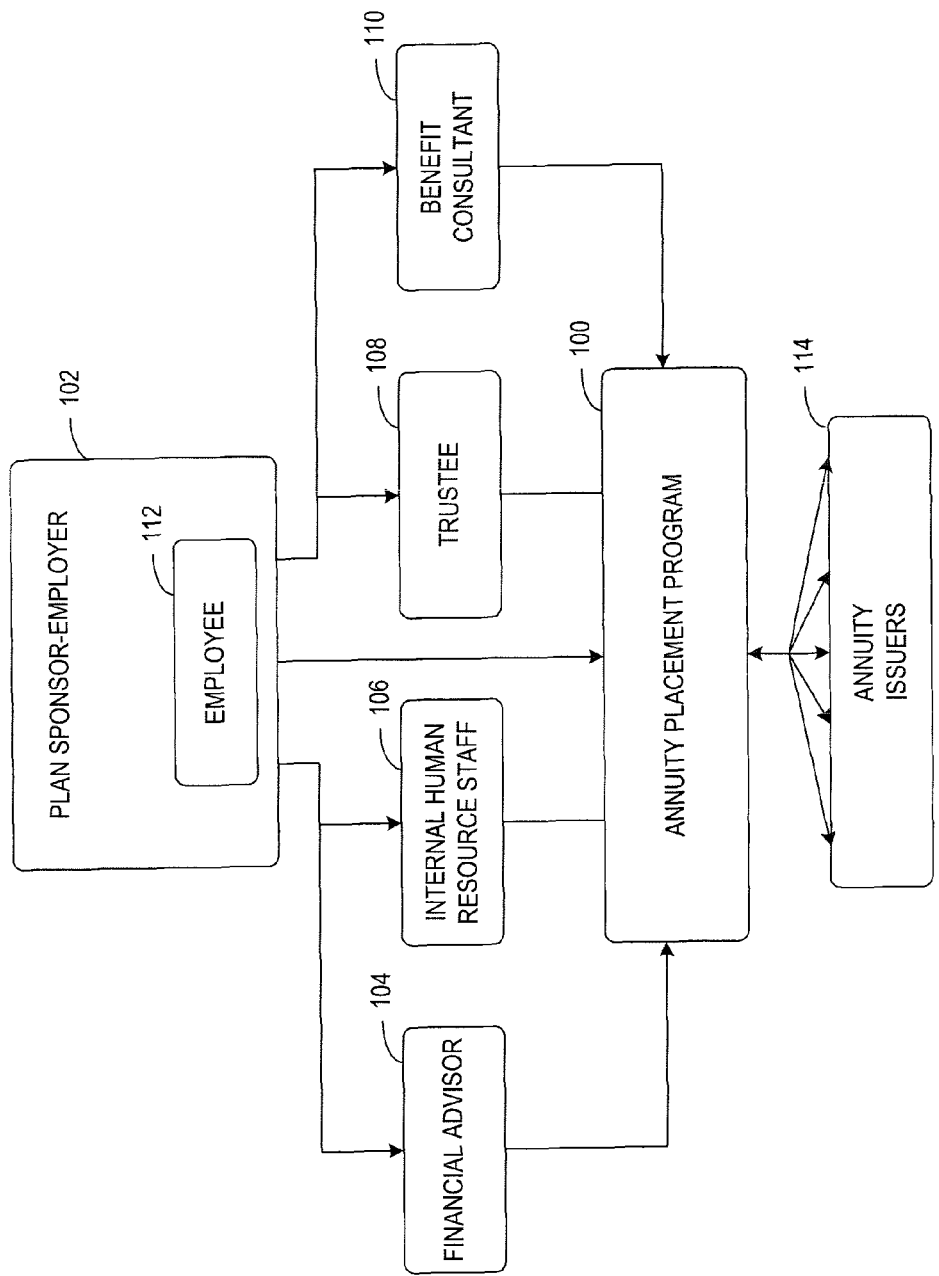
FIG. 1 is a block diagram illustrating a representative relationship between annuity purchasers and annuity issuers using the annuity placement platform of the present invention.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention relates generally to financial transaction processing, and more particularly, to a system and method for facilitating annuity contract quoting and purchasing between annuity purchasers and annuity providers.

The annuity placement approach of the present invention provides an annuity placement system and method designed to help individuals, such as transitioning employees, best meet their unique investment needs. This group of employees has an immediate focus on establishing an income stream to replace or supplement their earnings. Transitioning employees are generally over the age of fifty-five, and are either faced with unexpected separation from service, are within a certain number of years (e.g., five years) of expected retirement, or are retired and still remain active in the company retirement plan. While the description provided herein often refers to these "transitioning employees," it should be recognized that the system of the invention is applicable to any individuals wanting to obtain an annuity.

The system and methodology of the present invention empowers the transitioning employee in maximizing his/her retirement income. Whether the program is made available directly or indirectly, they will have independent access to high quality, competitively quote annuity products at the lowest possible cost. The system provides the ability for individuals, such as employees or transitioning employees, to solicit quotes and receive quotes for annuities at institutional cost rather than at retail cost. An electronic bidding system serves as a tool to the annuity seekers which can be accomplished through programs provided to these individuals directly, or can be provided through a network such as via an Internet web site. Without competitive quote information from a broad universe of issuers, there is no way of evaluating what is being offered. The present invention involves a competitive bidding session that encompasses multiple high-quality annuity providers, thereby obtaining the best possible pricing and terms. In accordance with the present invention, the transaction between annuity purchasers and providers is accomplished without an intermediary, as the system facilitates direct responses from the annuity providers. The annuity purchasers are obtaining live quotes from which they can actually purchase an annuity, thereby providing direct purchasing ability for the individuals.

In an exemplary embodiment, the present invention includes a web-based platform where users are able to select one of a plurality of interface options. A first interface is designed for plan sponsors, benefits consultants, record keepers, and other financial advisors who are making group annuity purchases on behalf of employees or clients. Another interface is designed for individual employees seeking direct access to annuity providers. In one embodiment, access to the web site is via a plan sponsor co-op. Individuals will receive access to institutional tools, and institutional pricing rather than retail pricing, and both contract expenses and pricing is taken into account. It provides unprecedented access to high quality annuity providers, and eliminates any need for a retail middleman or sales people.

As previously described, today insurance companies generally write group contracts for facilitating annuity purchases by plan participants to the corporate plan sponsor or to an agent of the plan appointed by the plan. A plan that can offer group annuities to its participants must have language in the plan document that allows for this distribution option. While pension funds (defined benefit plans) historically allowed for this option, and while plan sponsors were inclined to also provide such an option in their 401(k) plans, only an estimated 20% of current defined contribution plans still have an annuity option. Generally insurance company contracts were designed to be written to plan sponsors or agents of the plan, and additionally, group annuity contracts are written to plans that offer the annuity option for distributions for which the vast majority of plans no longer offer such an option. Therefore, it is most often the case that plan sponsors do not provide an annuity option, and plan sponsors are reluctant to institute such an option in new plans due to cost and liability issues.

The present invention solves these problems by making the annuity placement model of the present invention universally available and fair to all participants in any retirement plan. This is done by creating an acceptable discretionary group to be the contract holder (thereby eliminating the plan sponsors' involvement), and/or effecting the annuity purchase after a participant has taken a lump sum disbursement or has elected an IRA rollover option from the plan. In either case, the resulting structure does not rely on the plan sponsor or the plan document. This platform provides all participants equal access to annuities if their state's insurance law recognizes discretionary groups, and/or if a participant is involved in a qualified plan where a rollover can be effected.

FIG. 1 is a block diagram illustrating a representative relationship between annuity purchasers and annuity issuers using the annuity placement platform of the present invention. In one embodiment of the invention, the annuity placement platform is realized via a centralized annuity placement program 100 operable in a networked environment such as the Internet.

The plan sponsor-employer 102 represents the "sponsor" of an investment scheme, such as a retirement or annuity plan, on behalf of its employees or participants of the plan. The sponsor-employer 102 includes representatives of the plan sponsor-employer and/or other service providers. For example, these representatives and other service providers include financial advisors 104, human resource staff personnel 106, trustees 108, benefit consultants 110, and the like. Any of these representative persons, groups, or entities authorized to access the annuity placement program 100 may utilize the annuity placement program 100. In accordance with the invention, employees 112, such as the "transitioning employees" discussed above, can access the annuity placement program. These employees 112 or other persons wanting to purchase an annuity can purchase annuities at the same institutional pricing as the institutional entities (e.g., employers 102) rather than at retail annuity pricing. The annuity placement program 100 provides, among other things, competitive pricing, efficient on-line annuity quoting, an enhanced issuer universe, pre-approved products, and maximization of fiduciary compliance.

One or more annuity issuers 114 (also referred to as annuity providers) also have access to the annuity placement program 100 if authorized to do so. The present invention provides for an enhanced issuer universe, where the universe of issuers meet specific credit standards and will offer a predetermined (but adjustable) number of active providers. These active providers are quality providers having pre-approved quality standards that can be targeted by the annuity purchaser to provide annuity quotes. Any number of active annuity providers 114 may be configured for use with the annuity placement program. Custom credit screens are also available, as are issuer profiles on all active issuers 114.

The annuity placement program 100 facilitates the use of pre-approved and consistent contract terms, which can be presented in factual and standardized product profiles in the case where multiple product types are available. This provides for an improved product selection, standardized and approved terms, and complete product profiles, without the marketing hype and confusion. This also enables annuity purchasers to easily compare quotes from any category of product.

Fiduciary compliance is maximized through the prudent and comprehensive annuity quoting process, best case pricing, issuer credit screening, automated oversight reporting, and document analysis and decision results. The present invention helps plan sponsors 102, financial advisors 104, benefits consultants 110, trustees 108, etc. to maximize their fiduciary compliance and provides individuals the ability to meet their personal investment needs in the most prudent, competitive fashion possible.

With respect to competitive pricing, the most competitive pricing is achieved through creating a process that, due to several key components, brings significant leverage to bear and ensures that buyers obtain the best possible result. The issuers involved in the program are some of the most competitive players in the market, and the present invention provides significant incentive to participate. The present invention offers issuers tremendous potential volume and independent, cost-effective access to buyers nationwide or beyond. The pricing may be on a national (or international) platform, resulting in volume economies. Institutional pricing is available to the transitioning employee 112, and distribution costs are eliminated through use of the annuity placement program 100. Thus, the present invention provides competitive annuity quoting with a diverse group of active issuers, institutional pricing, elimination of distribution costs, issuer incentives, standardized expenses, and a national platform that provides for volume economies.

In accordance with one embodiment of the invention, an on-line quoting system is implemented. The on-line quoting system facilitates standardized formats for easy analysis, and provides an automated quote distribution to a broad universe. Automated quote process documentation may also provided. The on-line quoting is efficient, and results in a significant time savings. In one embodiment of the invention, competitive annuity quoting by annuity issuers to annuity purchasers (such as transitioning employees 112) is effected in a manner as described herein and as described in U.S. patent application Ser. No. 09/790,268, entitled "System And Method For Facilitating Electronic Bidding Between Buyers And Sellers In Financial Industries," the content of which is incorporated herein by reference.

Figure 2:
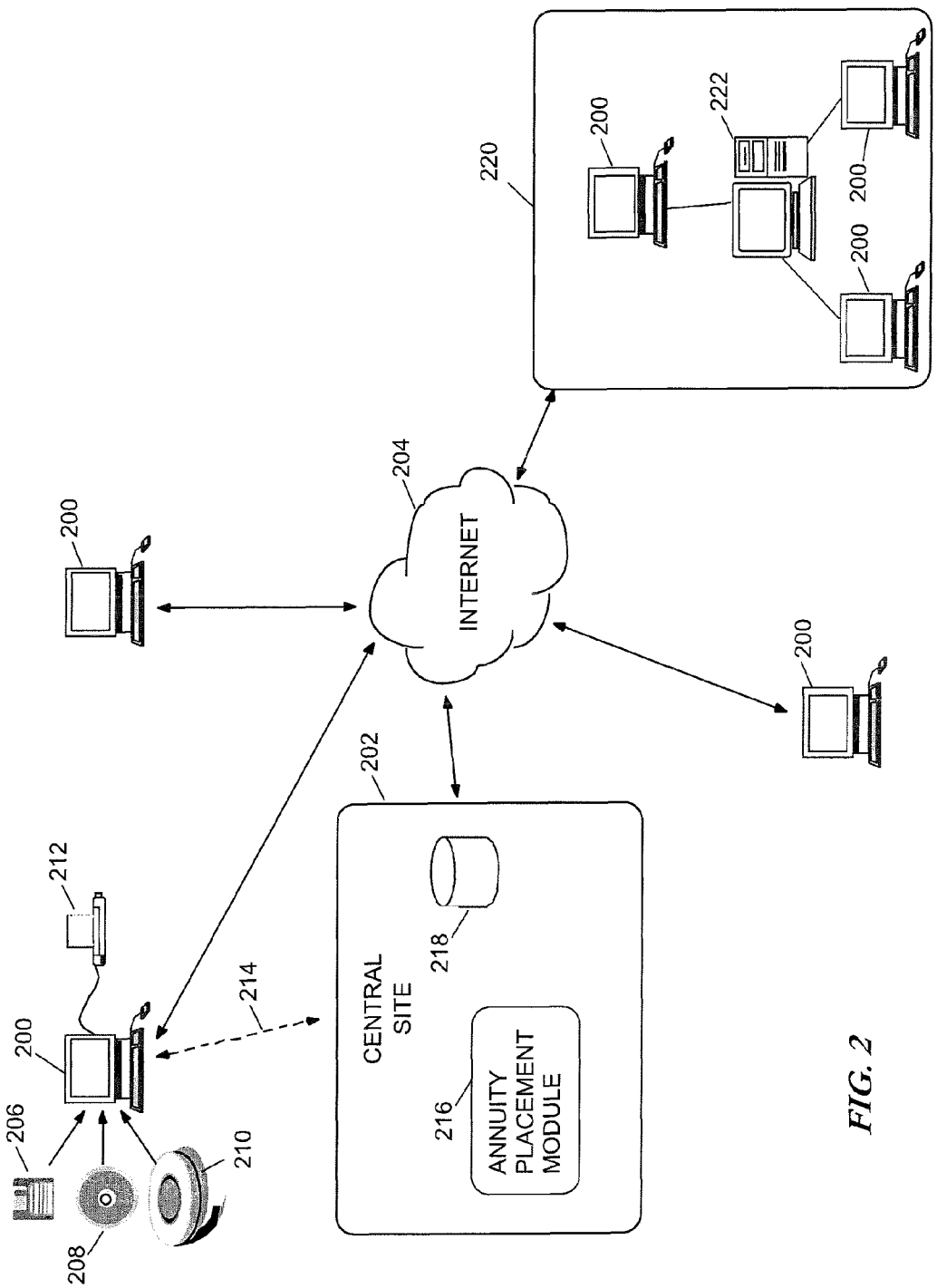
FIG. 2 is a system level diagram illustrating one manner of facilitating an electronic annuity transaction between annuity purchasers and annuity providers.

FIG. 2 is a system level diagram illustrating one manner of facilitating an electronic annuity transaction between annuity purchasers and annuity providers. One or more computing systems 200 can communicate with one another, and with the central site 202, via electronic transfer of information. This can be accomplished, for example, via the Internet 204. Each computing system 200 may include one or more various types of storage mediums to store program instructions that control the processing functions and actions taken by the computing system 200, such as diskette 206, CD-ROM 208, tape 210, etc. Reports and other documentation may be printed on printer 212. Computing systems 200 represent systems used by those who utilize the present invention, including but not limited to annuity purchasers, plan sponsors-employers, annuity providers, financial advisors, etc.

Figure 3:
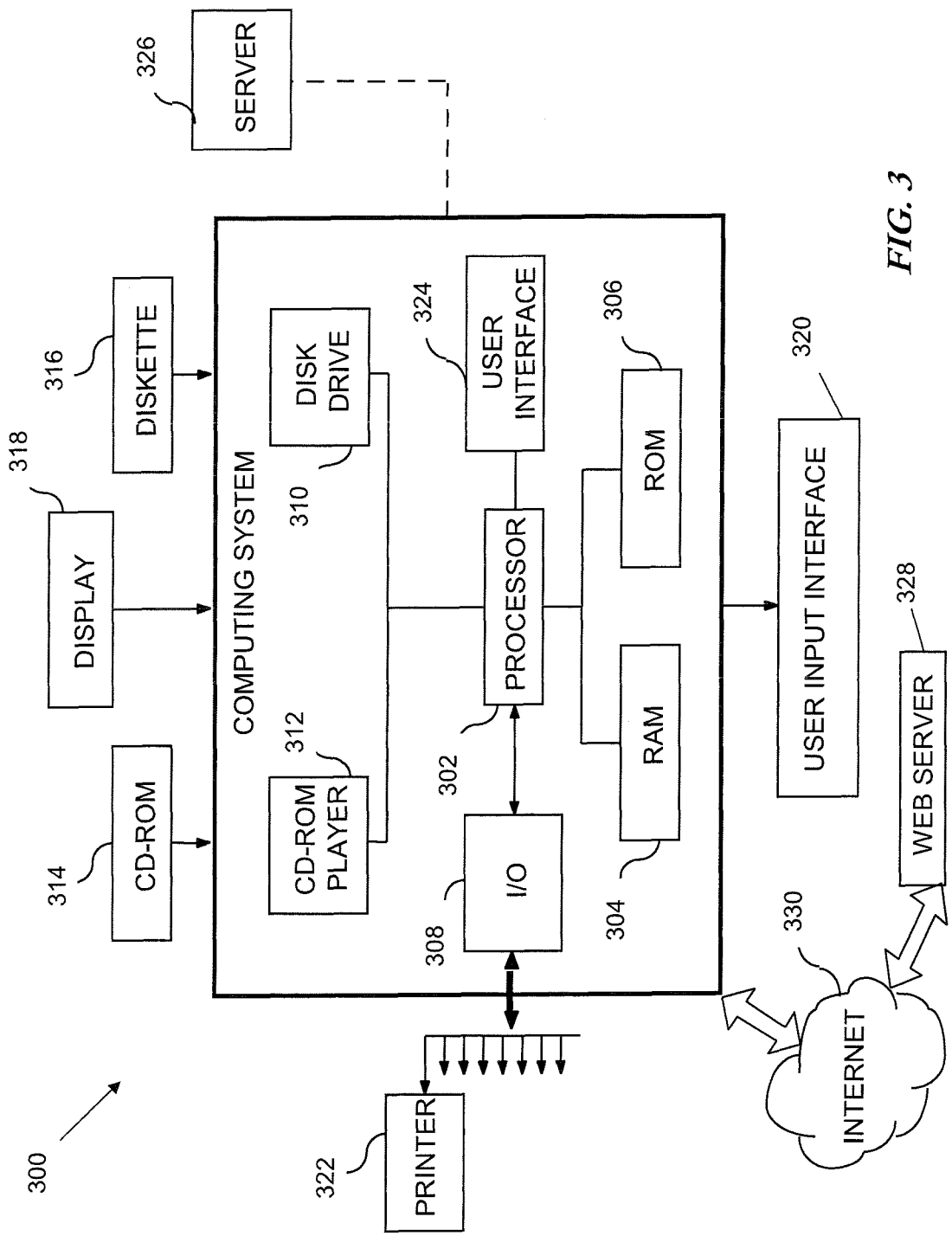
FIG. 3 is a representative computer system that can be employed by any one or more of the annuity placement system, annuity purchasers, annuity providers, and plan sponsors/employers.

Each of the user computing systems 200 are suitable for performing the functions in accordance with the present invention. Referring to FIG. 3, an illustration is provided that depicts the various components associated with a typical user computing system 300. The computing system 300 typically includes a central processor (CPU) 302 coupled to random access memory (RAM) 304 and read-only memory (ROM) 306. The processor 302 communicates with other internal and external components through input/output (I/O) circuitry and bussing 308. The computing system 300 may also include one or more data storage devices, including hard and floppy disk drives 310 and a CD-ROM drive 312. In one embodiment, software containing application software, such as file management or command shell programs, may be stored and distributed on a CD-ROM 314, diskette 316, or other medium that may be inserted into, and read by, the CD-ROM drive 312 or the disk drive 310 respectively. The computing system 300 is also coupled to a display 318, a user input interface 320 such as a mouse and keyboard, and a printer 322. The user typically inputs and outputs information by interfacing with the computing system 300 through the user interface 324, which interacts with user input interface 320 and display 318. The computer may optionally be connected to network server 326 in a local network configuration. The computer may further be part of a larger network configuration as in a global area network (GAN) such as the Internet. In such a case, the computer accesses one or more web servers 328 via an internet 330. In one embodiment of the present invention, the computer systems 300 communicate via the Internet 330, which is facilitated by the annuity placement program hosted on one or more web servers 328.

It should be recognized that the "user interface" generally includes the devices that allow the user to interface with the computer, both from an input and output standpoint. Thus, input mechanisms are part of the user interface, such as a keyboard, mouse, trackball, joystick, touch screen, verbal or other audio command input, etc. These and other input user interface devices are known in the art. Similarly, output user interface devices, such as a display or monitor, audio output, etc. may be used in connection with the invention, and are also well known in the art.

Referring again to FIG. 2, the information communicated may be transferred via the Internet 204 to and from the central site 202 so that individual annuity purchasers can communicate with annuity providers. Optionally, a computing system 200 may have a direct electronic link to the central site 202, as depicted by dashed line 214. The central site 202 may be located at a single location, or alternatively may be a distributed system. In one embodiment of the invention, the central site 202 includes the annuity placement module 216, which includes (for example) one or more computing system servers to host the annuity placement program via the Internet. The central site 202 may also include database storage 218 for storing data used by the annuity purchasers and issuers. For example, database storage 218 may store instructional resources for annuity purchasers to learn how annuities work, and whether an annuity is an appropriate investment vehicle for the particular individual. The database storage 218 also stores annuity issuer information to facilitate communication between annuity purchasers and issuers. The database storage 218 may be used to store any structured data that is desired to be stored. Thus, the central site 202 represents the computing system that hosts the annuity placement program of the present invention. The central site 202 computing system may include computer features such as those generally described in connection with FIG. 3, but may be any computing system capable of hosting an annuity placement module as described herein. Other computers 200 arranged in a network 220 via a server 222 may also be coupled to the central site 292, preferably via the Internet 204.

Figure 4:
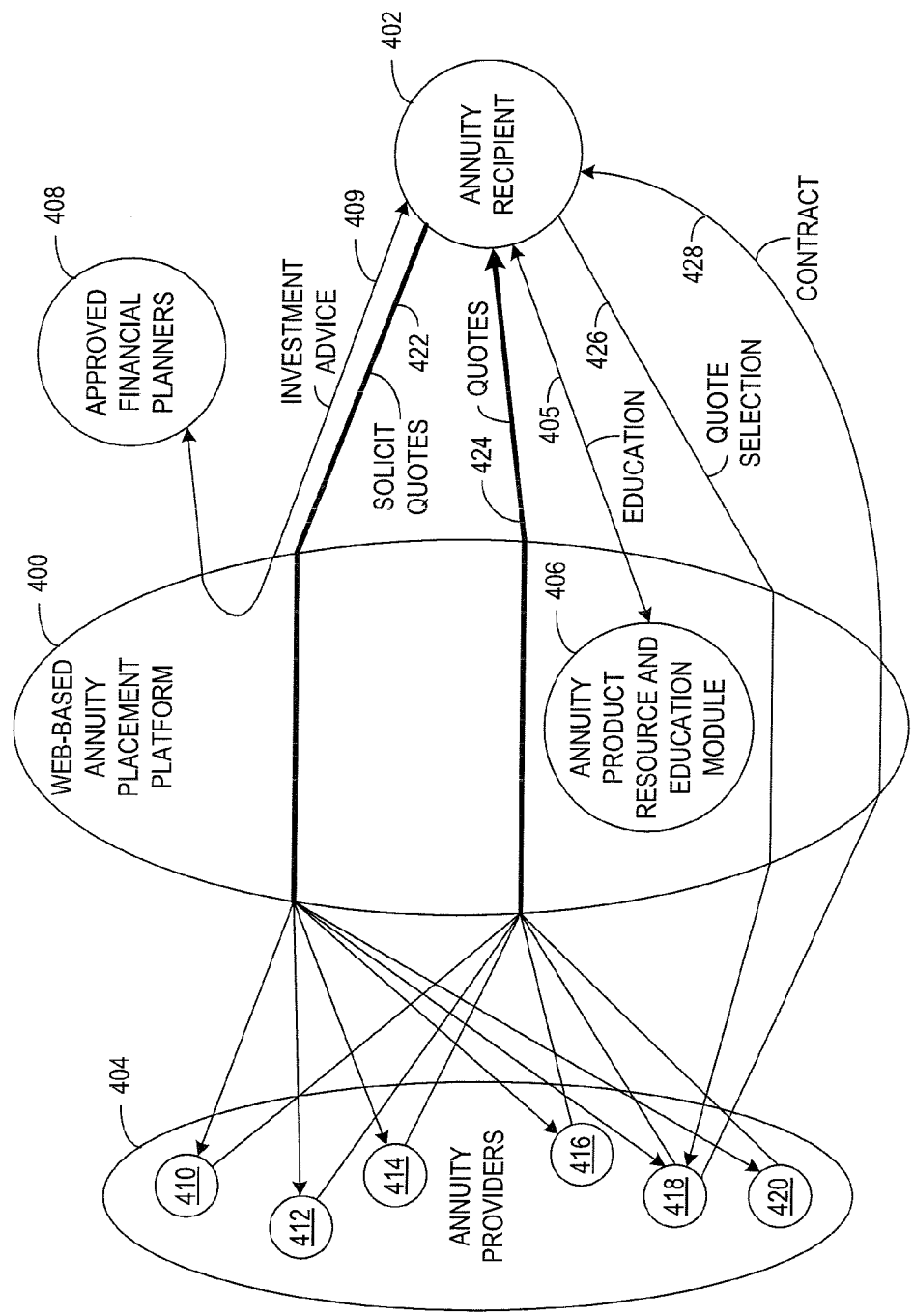
FIG. 4 is a diagram illustrating one embodiment of a transaction flow in accordance with the principles of the present invention.

FIG. 4 is a diagram illustrating one embodiment of a transaction flow in accordance with the principles of the present invention. At the core of the annuity transactions is the annuity placement platform 400, which in one embodiment is a web-based annuity placement program operating on a computing system capable of facilitating communications between one or more annuity purchasers 402 and one or more annuity providers 404. Individuals 402 desiring an annuity can obtain information or otherwise educate themselves by accessing the annuity product resource and education module 406 that is available via the annuity placement platform 400, as illustrated by line 405. For example, the annuity product resource and education module 406 may include educational information as to how annuities work and the various types of annuities that are available, articles relating to annuities, glossaries, and other information regarding annuities in general and how the annuity placement platform can assist the annuity purchaser 402 in acquiring an annuity. Other information is also available, such as an income calculator that can be accessed by the annuity purchaser 402 to calculate the amount of income that an annuity is capable of providing relative to the annuity investment. Furthermore, the annuity placement platform 400 facilitates contact and/or communication between the purchaser 402 and one or more approved financial planners 408 as shown via line 409.

The annuity purchaser 402 can decide to solicit quotes from one or more annuity providers 404. A quote request is essentially an invitation to the annuity providers to provide a quote for the annuity contract. Quotes are proposed annuity terms which will form the basis of an annuity contract if both the annuity purchaser and provider agree to the terms of the quote (also referred to as a "bid"). The annuity placement platform 400 allows the annuity purchaser to identify at least one, and likely multiple, annuity providers in which to solicit an annuity quote. In the illustrated example of FIG. 4, the annuity purchaser 402 solicits quotes from a plurality of annuity providers, including annuity providers 410, 412, 414, 416, 418, and 420. Any number of annuity providers may be designated, and such designations may be individually selected or screened by the provider of the service (e.g., plan sponsor). Alternatively, such designations may be selected by default, such as where a predetermined number of annuity providers 404 are automatically designated to receive an annuity purchaser's quote solicitations.

In accordance with one embodiment of the invention, the annuity purchaser's 402 quote solicitations are created by the annuity purchaser 402 with the assistance of the annuity placement platform 400. In one embodiment, the annuity purchaser 402 indicates via a computing system coupled to the web-based annuity placement platform 400 that an annuity quote is desired, which in response presents an on-line form in which the purchaser 402 can complete. The form prompts the purchaser 402 to enter information about the purchaser 402, including, for example, the name, age, gender, and residence of the annuitant, as well as information relating to the investment amount and type of annuity desired. The purchaser 402 can review and confirm the information prior to submitting the quote request, and if the purchaser thereafter elects to solicit quotes, the quote request is submitted by the purchaser 402 to the designated annuity providers 404 as illustrated by line 422.

The targeted annuity providers 410, 412, 414, 416, 418, and 420 receive notification through the annuity placement platform that one or more quote requests have been submitted. In response, the annuity providers 410, 412, 414, 416, 418, 420 can access the annuity placement platform 400 through an appropriate user interface, thereby allowing the annuity providers to submit a quote in response to each received quote request. Each targeted annuity provider 410, 412, 414, 416, 418, 420 reviews, either manually or electronically, the information accompanying the particular quote request. This information includes the potential annuity purchaser's date of birth, gender, investment amount and estimated deposit date, and the like, so that the annuity provider's can arrive at a quote. Each annuity provider thus enters information as to the income that provider can provide based on the purchaser's 402 information. When a particular annuity provider 410, 412, 414, 416, 418, 420 has entered the appropriate data, the respective provider submits the quote via the annuity placement platform 400 as shown by line 424.

The annuity purchaser 402 can access the quotes submitted by the various annuity providers 404 via the annuity placement platform 400. In one embodiment of the invention, the purchaser 402 can be notified, such as via e-mail, when a quote has been submitted. In another embodiment, the annuity providers are requested to provide a quote within a predetermined period of time, such as within twenty-four hours of receipt of the quote request. While the annuity purchaser 402 can view quotes as they are posted via the annuity placement platform 400, the annuity purchaser 402 may want to wait until all (or at least an adequate number) of the quotes have been received before comparing the various quotes. In one embodiment, the annuity purchasers 402 may be prohibited from selecting a quote until all of the targeted annuity providers 410, 412, 414, 416, 418, 420 have submitted their quotes, or until a predetermined time has passed (e.g., twenty-four hours or other predetermined time duration).

When the quotes have been received, the annuity purchaser 402 can compare each of the quotes that have been posted via the annuity placement platform 400 and make a quote selection. The purchaser 402 selects the quote using a computing system having a user interface to the annuity placement platform 400. For example, the purchaser 402 can select the quote submitted by annuity provider 418, as shown by line 426. When this occurs, a contract is written by the annuity provider 418 to the group contract holder for the annuity purchaser 402, as depicted by line 428. The contract is written by the annuity provider 418 to the group contract holder, and the purchaser 402 receives a certificate issued by the annuity provider 418 by way of the plan (or discretionary group as described more fully below) as the group contract holder.

Figure 5:
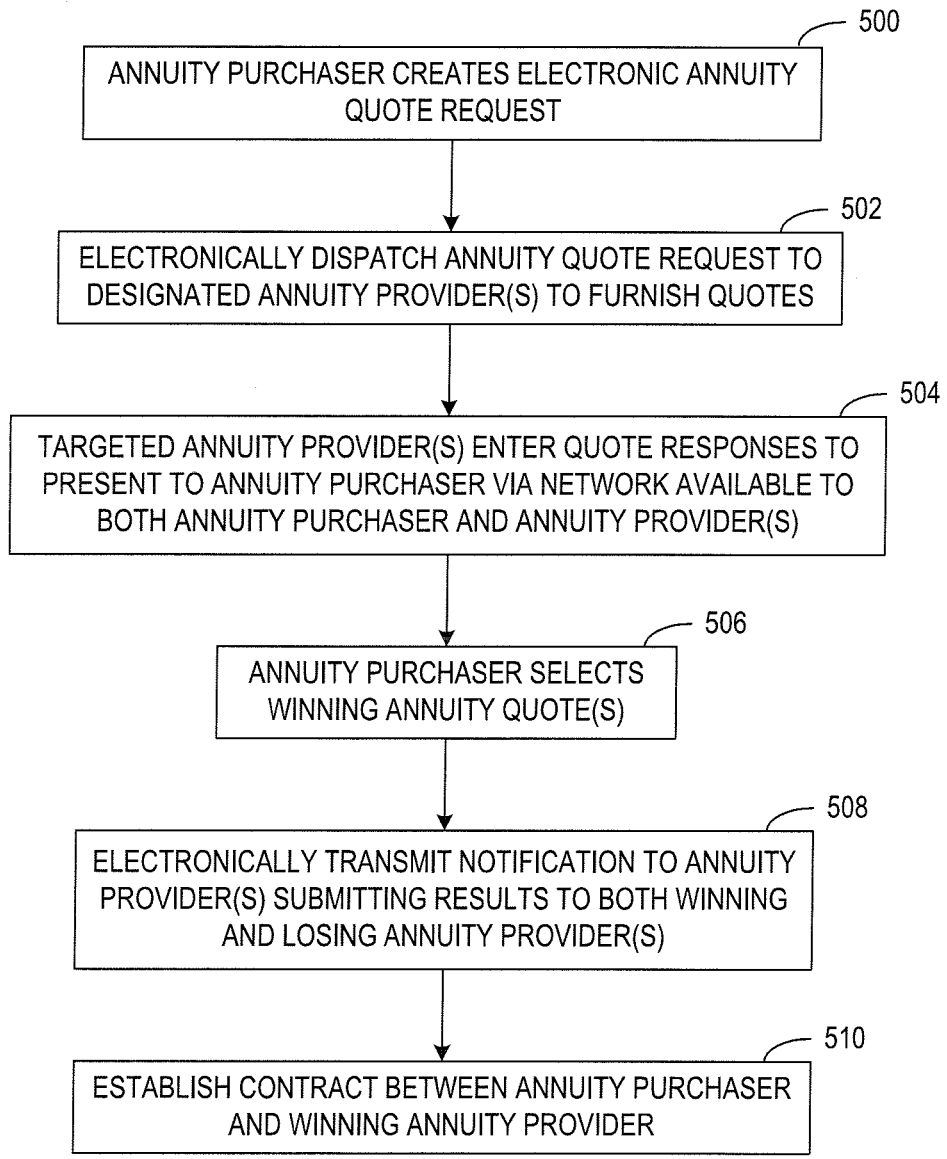
FIG. 5 is a flow diagram of one embodiment of an annuity transaction utilizing the annuity placement platform in accordance with the present invention.

FIG. 5 is a flow diagram of one embodiment of an annuity transaction utilizing the annuity placement platform in accordance with the present invention. The annuity purchaser, such as a transitioning employee, creates 500 an electronic annuity quote request via the annuity placement platform. The annuity quote request is electronically dispatched 502 to the designated annuity providers to prompt the designated annuity providers to furnish quotes. The targeted annuity providers enter quote responses, as shown at block 504, to present to the annuity purchaser via the annuity placement platform, which in one embodiment is available to both the annuity purchaser and provider via a network such as the Internet. The annuity purchaser selects 506 the winning annuity quote. For example, the annuity purchaser may select the quote providing the highest annuity payments, or the annuity purchaser may select a quote that does not provide the highest annuity but is associated with an annuity provider desired by the annuity purchaser. Regardless of the annuity purchaser's reasons for the decision, the annuity purchaser selects 506 a winning quote. This selection is electronically transmitted 508 to the winning annuity provider, and may also be transmitted to the annuity providers not selected by the annuity purchaser. When the quote has been purchased by the annuity purchaser, a contract is established 510 between the annuity purchaser and the annuity provider by having the contract written to the plan sponsor or discretionary group associated with the annuity purchaser. The annuity purchaser receives a certificate issued by the annuity provider. In cases where an individual is not associated with a qualified plan or is not associated with the discretionary group facilitated by the present invention, the contract may be written directly to the annuity purchaser.

Figure 6:
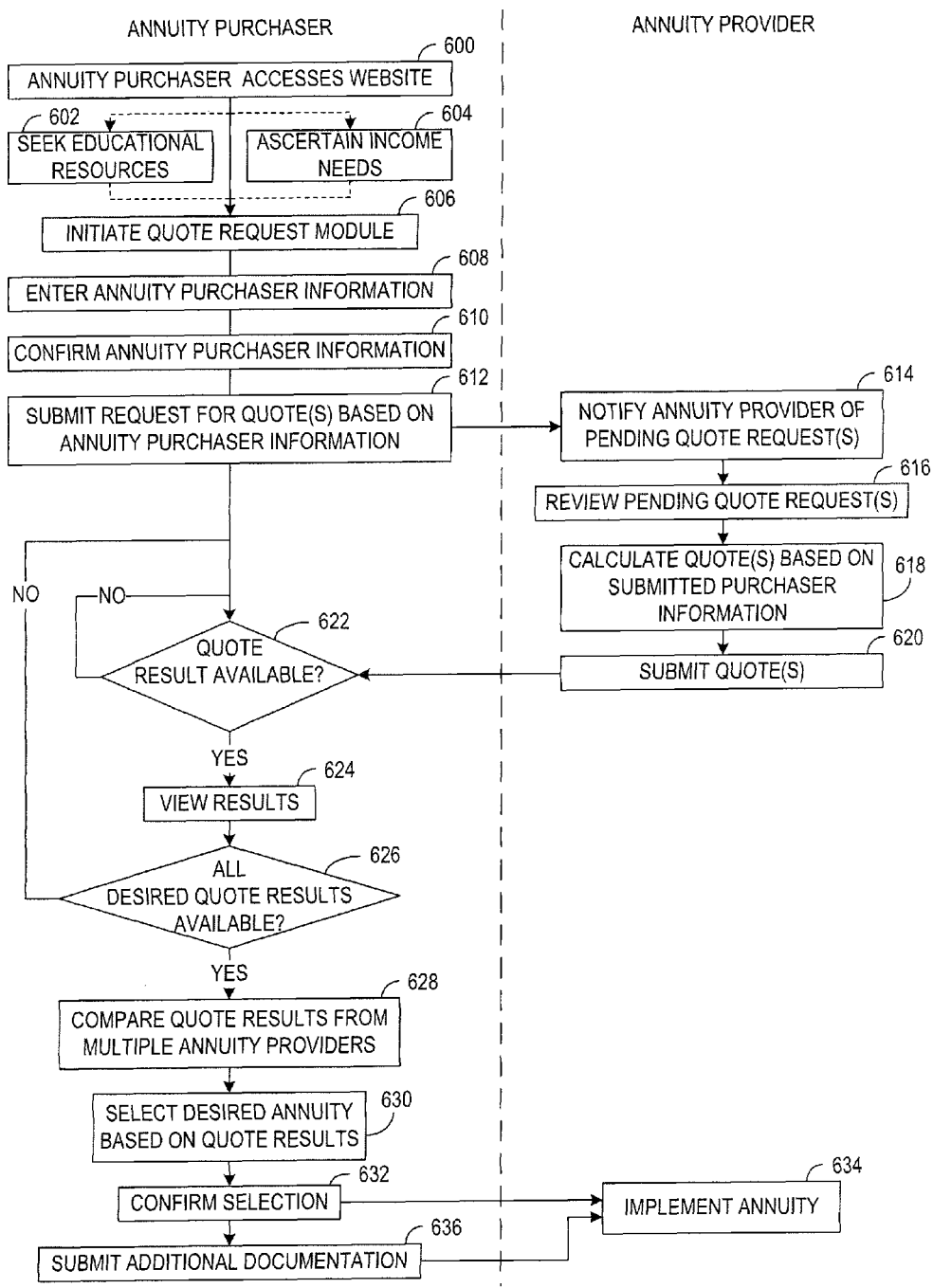
FIG. 6 is a flow diagram of a more detailed embodiment of an annuity transaction utilizing the annuity placement platform according to the present invention.

FIG. 6 is a flow diagram of a more detailed embodiment of an annuity transaction utilizing the annuity placement platform according to the present invention. The flow diagram of FIG. 6 distinguishes between functions associated with the annuity purchaser and those associated with the annuity providers. The purchaser accesses 600 the annuity placement platform, which in one embodiment is accessed via an Internet web site although other networked arrangements are also applicable. The purchaser may optionally access educational resources and/or ascertain income needs, as illustrated by blocks 602 and 604 respectively. The purchaser initiates 606 a quote request module, where information about the purchaser can be entered 608 and confirmed 610. The result of the purchaser's entry of this information is a solicitation for an annuity quote (i.e., a quote request), which is submitted 612 to one or more annuity providers. The annuity purchaser then waits until quotes are provided from the annuity providers, as illustrated at decision block 622 where the purchaser waits for quotes to become available.

When the purchaser submits 612 requests for annuity quotes to the desired annuity providers, the annuity providers may be notified 614 of the pending quote request(s). For example, the annuity providers may be notified via e-mail or other communication mechanism. Alternatively, the annuity providers may be notified by an indication that is available upon the annuity provider's periodic monitoring of the annuity placement platform. For example, an annuity provider may monitor the annuity placement platform once per day, twice per day, etc., at which time an indication is provided that one or more quote requests are pending and awaiting a responsive quote. The annuity providers review 616 the pending quote requests, which includes information about the purchaser himself/herself, as well as the particulars of the desired investment. The annuity providers calculate 618 an annuity quote based on the purchaser information submitted with the quote request. Once entered, the quote(s) is submitted 620 to the annuity placement platform for subsequent access by the requesting annuity purchaser.

For any particular quote provided by an annuity provider, the quote will become available for viewing by the purchaser. For example, the purchaser may be notified via e-mail or other communication mechanism that a quote has become available. Alternatively, the purchaser may simply monitor the annuity placement platform (e.g., monitor the Internet website from which quotes are obtained by the purchaser) in order to determine the existence of a responsive quote. When a quote becomes available as determined at decision block 622, the purchaser can view 624 the results. At some time, all of the desired quote results will become available, as determined at decision block 626. For example, the "desired" quote results may be all of the quote results corresponding to the quote requests. Alternatively, the desired quote results may be some subset of all of the quote results that may ultimately be submitted by the targeted annuity purchasers. In any case, when the desired quote results become available as determined at decision block 626, the annuity purchaser can compare 628 the various quote results from the various annuity providers. The purchaser then selects 630 the most desirable annuity based on the various quotes. The most desirable annuity generally corresponds to the annuity providing the highest income, however the purchaser may select a different annuity provider for other reasons. In one embodiment of the invention, the selection is confirmed 632 by the purchaser to verify the purchaser's decision. When the annuity has been conclusively purchased by the purchaser, the annuity can then be implemented 634 when the annuity provider is notified of the purchaser's decision to accept the annuity provider's quote. Other information or documentation may also be submitted 636, such as a signed version of the annuity purchase agreement.

In one embodiment of the invention, the annuity placement platform is implemented via an annuity placement program operable on a networked computing system, such as a web server operable on the Internet. In this embodiment, the annuity purchasers and annuity providers access the annuity placement program via computer systems coupled to the Internet, although the present invention is equally applicable to any networked system. The annuity purchasers and providers access the annuity placement program via user interfaces on the annuity purchasers and providers computer systems as provided by the annuity placement program. For example, both the annuity purchasers and annuity providers can access the annuity placement program by directing their computer systems to respective web addresses where the annuity placement program is accessible. The annuity placement program allows the annuity purchasers and providers to access the functionality of the program via user interfaces, such as graphical user interfaces (GUI), text entry, voice entry, or other user entry mechanisms.

In one particular embodiment, the user interface is largely provided via a combination of graphical user interface (GUI) and text entry mechanisms. FIGS. 7-22 provide an example of how such interfaces are used by the annuity purchasers and annuity providers to carry out the desired annuity quoting and annuity selection process as facilitated by the annuity placement platform. Therefore, the examples set forth in FIGS. 7-22 are provided to facilitate an understanding of one representative manner in which the present invention may be implemented. However, these examples are illustrative, and the invention is not limited to such user interface implementations. It should also be noted that references to "buttons" or other similar terms includes any visual indicia represented via a computer user interface that can be selected in any number of ways (e.g., selected via mouse, joystick, keyboard entry, voice or other sound entry, touch screen, etc.).

Figure 7:
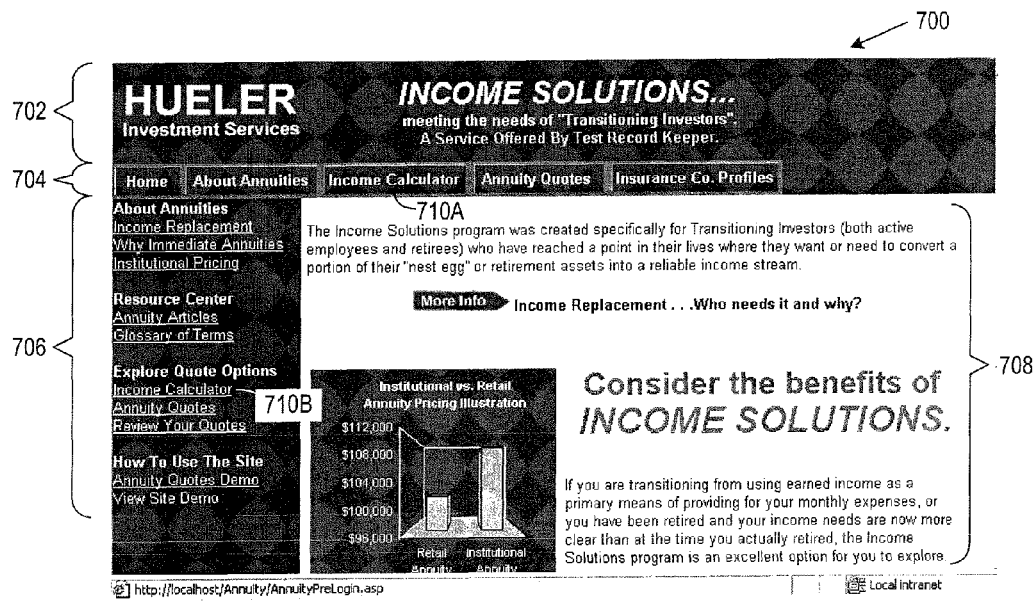
FIG. 7 illustrates an exemplary introduction user interface screen provided by the annuity placement program and available to annuity purchasers.
Figure 8:
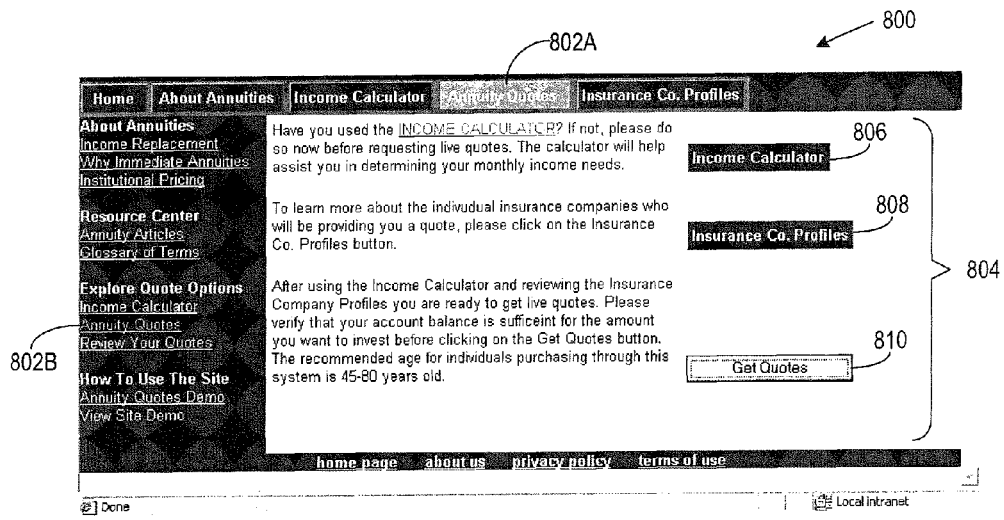
FIG. 8 illustrates an exemplary user interface that may be presented to the annuity purchaser in order to suggest that the annuity purchaser perform one or more preliminary operations prior to submitting a quote solicitation.

Referring now to FIG. 7, an exemplary introduction user interface screen 700 provided by the annuity placement program and available to annuity purchasers is illustrated. The user interface screen 700 is provided to potential annuity purchasers via a web site in one embodiment of the invention. Upon entry of a predetermined Uniform Resource Locator (URL) or other addressing mechanism, the annuity purchaser is presented with the user interface screen 700. Such a user interface screen 700 may include a company presentation area 702, a toolbar 704, a link (e.g., hyperlink) bar 706, and an information presentation area 708. The toolbar 704 includes one or more visual icons or buttons that direct the user (i.e., annuity purchaser) to a particular web page upon selection. The link bar 706 includes one or more links in which the user may select, and in one embodiment these links are grouped into categories. Selection of a link will present the corresponding information in the information presentation area 708.

For example, user selection of a link entitled "Glossary of Terms" will present an annuity glossary in the information presentation area 708. In one embodiment of the invention, one or more of the links in the link bar 706 and/or the toolbar 704 provide the user access to the annuity product resource and education module as described in FIG. 4 (annuity product resource and education module 406). These links allow the user to review instructional information relating to annuities, and to understand the manner in which the annuity placement platform facilitates the purchase of such an annuity at institutional pricing. Such instructional information may include, for example, annuity articles, glossaries, instructions, explanations, information on annuity providers such as insurance company profiles, etc.

The link bar 706 and/or the toolbar 704 may also include links to executable programs such as an income calculator. For example, user selection of the "Income Calculator" button 710A or the "Income Calculator" link 710B will present the user with an income calculator from which the potential annuity purchaser can determine an estimated income from a particular investment amount. Such an income calculator may also be presented upon user selection of other particular buttons or links, such as upon selection of the "Annuity Quotes" button 802 shown on the user interface screen 800 of FIG. 8. When a potential annuity purchaser selects the "Annuity Quotes" button 802A or alternatively the "Annuity Quotes" link 802B, the annuity placement module may opt to suggest use of the income calculator by presenting instructional information in the information presentation area 804. This information may suggest that the potential annuity purchaser utilize the income calculator to assist the potential annuity purchaser in determining income needs. An "Income Calculator" button 806 may be presented in the information presentation area 804 for convenience to the user. Additional information and corresponding buttons may also be provided in the information presentation area 804, such as information about particular annuity providers and a corresponding button 808 to allow the user to conveniently link to such annuity provider information. A "Get Quotes" button 810 is also provided upon selection of the Annuity Quotes button/link 802A/802B to allow the user to initiate the quote solicitation process when the user is prepared to do so.

Figure 9:
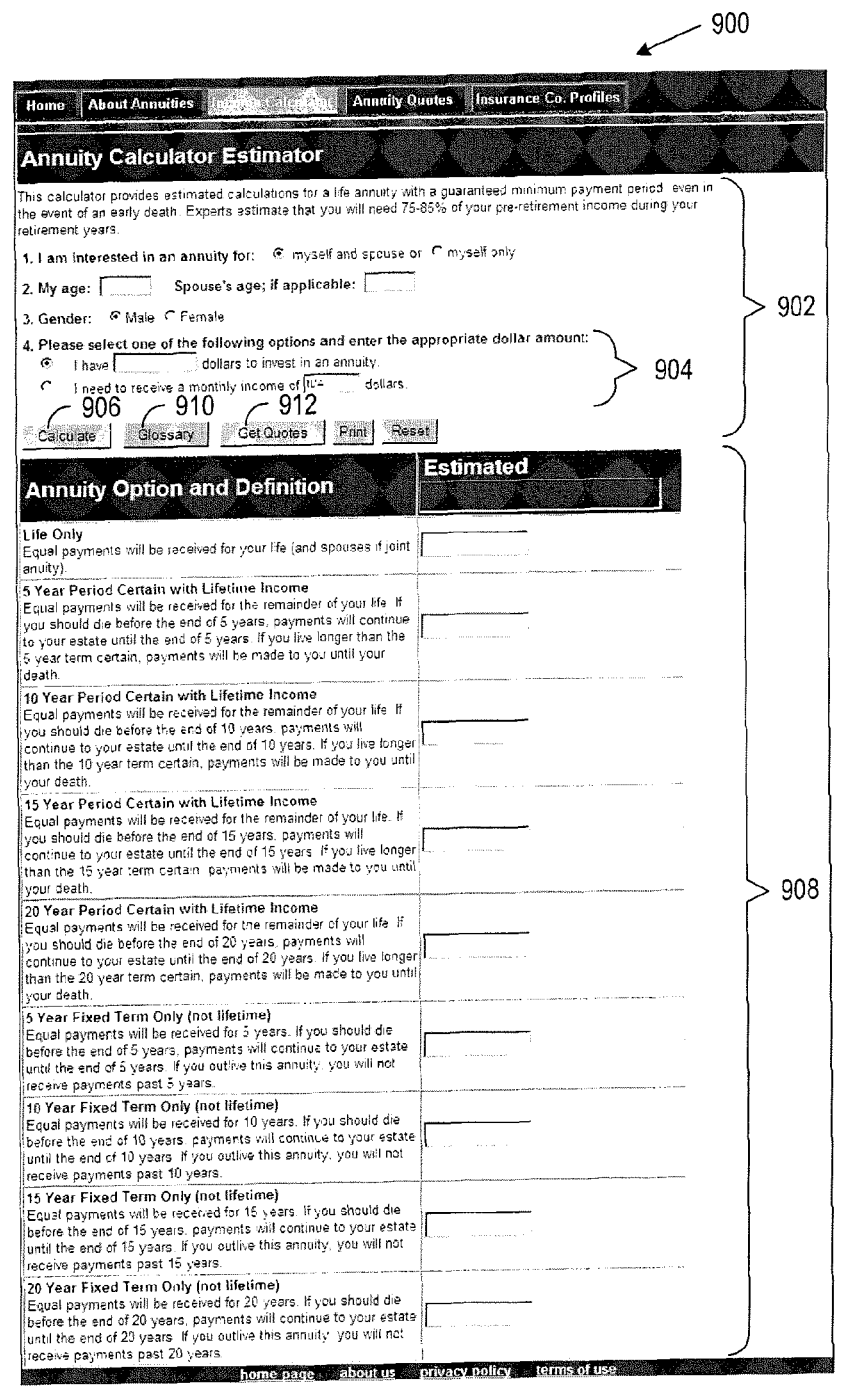

FIG. 9 illustrates an example of an income calculator user interface screen 900 from which the potential annuity purchaser can determine his/her estimated monthly income based on a proposed investment amount, or the estimated one-time payment required to obtain a desired monthly income. The income calculator user interface screen 900 is presented upon the user's selection of any of the "Income Calculator" links or buttons made available to the user. The income calculator presents a data entry area 902, where the potential annuity purchaser enters information used in the calculated estimates. In one embodiment of the invention, the income calculator prompts the potential annuitant to enter information such as whether the annuity would be only for an individual or an individual/spouse combination, the age of the potential annuitant (and spouse if applicable), the potential annuitant's gender, and financial information used in the calculation.

In one embodiment, the annuity placement program prompts the potential annuitant to enter a monetary amount corresponding to the amount of money in which the potential annuitant would like to invest in an annuity. This financial information is entered into financial entry area 904, and the user then selects a "Calculate" button 906 to calculate one or more estimates of monthly incomes based on the entered monetary amount. These estimates are illustrated in the annuity estimate field 908. In the illustrated embodiment of FIG. 9, a plurality of estimates are provided upon selection of the "Calculate" button 906, where each of the estimates corresponds to a different type and term of annuity. For example, for a 55 year-old male making an investment of $300,000 for himself only, the various estimates may correspond to annuity types and terms including those listed in Table 1 below:

TABLE 1

| ANNUITY OPTION AND DEFINITION | ESTIMATED |
|---|---|
| LIFE ONLY:<br>Equal payments will be received for your life (and spouses if joint annuity) | $ 1,938 |
| 5 YEAR PERIOD CERTAIN WITH LIFETIME INCOME:<br>Equal payments will be received for the remainder of your life. If you should die<br>before the end of 5 years, payments will continue to your estate until the end of 5 | $ 1,929 |

TABLE 1-continued

| ANNUITY OPTION AND DEFINITION | ESTIMATED |
|---|---|
| years. If you live longer than the 5 year term certain, payments will be made to you until your death. | |
| 10 YEAR PERIOD CERTAIN WITH LIFETIME INCOME: Equal payments will be received for the remainder of your life. If you should die before the end of 10 years, payments will continue to your estate until the end of 10 years. If you live longer than the 10 year term certain, payments will be made to you until your death. | $ 1,907 |
| 20 YEAR PERIOD CERTAIN WITH LIFETIME INCOME: Equal payments will be received for the remainder of your life. If you should die before the end of 20 years, payments will continue to your estate until the end of 20 years. If you live longer than the 20 year term certain, payments will be made to you until your death. | $ 1,831 |
| 5 YEAR FIXED TERM ONLY (NOT LIFETIME): Equal payments will be received for 5 years. If you should die before the end of 5 years, payments will continue to your estate until the end of 5 years. If you outlive this annuity, you will not receive payments past 5 years. | $ 6,327 |
| 10 YEAR FIXED TERM ONLY (NOT LIFETIME): Equal payments will be received for 10 years. If you should die before the end of 10 years, payments will continue to your estate until the end of 10 years. If you outlive this annuity, you will not receive payments past 10 years. | $ 3,441 |
| 20 YEAR FIXED TERM ONLY (NOT LIFETIME): Equal payments will be received for 20 years. If you should die before the end of 20 years, payments will continue to your estate until the end of 20 years. If you outlive this annuity, you will not receive payments past 20 years. | $ 2,157 |

As can be seen, the income calculator allows the potential annuitant to view estimates for a variety of different annuity types and terms. Other annuity types and terms may also be provided by the income calculator that are not shown in Table 1.

Alternatively, the potential annuitant can enter information corresponding to a desired monthly income into the financial entry area 904. In this case, when the user selects the "Calculate" button 906, one or more estimates of the one-time payment required to produce such a monthly income is presented. These estimates are illustrated in the annuity estimate field 908. For example, for a 55 year-old male who desires a $2,000 monthly income, various one-time payment estimates corresponding to different annuity types and terms are provided as shown in Table 2 below:

TABLE 2

| ANNUITY OPTION AND DEFINITION | ESTIMATED |
|---|---|
| LIFE ONLY: Equal payments will be received for your life (and spouses if joint annuity) | $ 309,541 |
| 5 YEAR PERIOD CERTAIN WITH LIFETIME INCOME: Equal payments will be received for the remainder of your life. If you should die before the end of 5 years, payments will continue to your estate until the end of 5 years. If you live longer than the 5 year term certain, payments will be made to you until your death. | $ 311,060 |
| 10 YEAR PERIOD CERTAIN WITH LIFETIME INCOME: Equal payments will be received for the remainder of your life. If you should die before the end of 10 years, payments will continue to your estate until the end of 10 years. If you live longer than the 10 year term certain, payments will be made to you until your death. | $ 314,708 |
| 20 YEAR PERIOD CERTAIN WITH LIFETIME INCOME: Equal payments will be received for the remainder of your life. If you should die before the end of 20 years, payments will continue to your estate until the end of 20 years. If you live longer than the 20 year term certain, payments will be made to you until your death. | $ 327,685 |
| 5 YEAR FIXED TERM ONLY (NOT LIFETIME): Equal payments will be received for 5 years. If you should die before the end of 5 years, payments will continue to your estate until the end of 5 years. If you outlive this annuity, you will not receive payments past 5 years. | $ 94,839 |
| 10 YEAR FIXED TERM ONLY (NOT LIFETIME): Equal payments will be received for 10 years. If you should die before the end of 10 years, payments will continue to your estate until the end of 10 years. If you outlive this annuity, you will not receive payments past 10 years. | $ 174,360 |
| 20 YEAR FIXED TERM ONLY (NOT LIFETIME): Equal payments will be received for 20 years. If you should die before the end of 20 years, payments will continue to your estate until the end of 20 years. If you outlive this annuity, you will not receive payments past 20 years. | $ 278,187 |

As can be seen, the income calculator allows the potential annuitant to view one-time payment estimates that will produce a desired monthly income for a variety of different annuity types and terms. Other annuity types and terms may also be provided by the income calculator that are not shown in Table 2.

Other information may be provided in the data entry area 902, such as a "Glossary" button 910. Selection of the "Glossary" button 910 will present a glossary of terms to assist the user with the definition of terms used in the annuity estimate field 908. If the user has determined a particular annuity option, the user can select the "Get Quotes" button 912 to initiate the quote solicitation process described more fully below.

Figure 10:
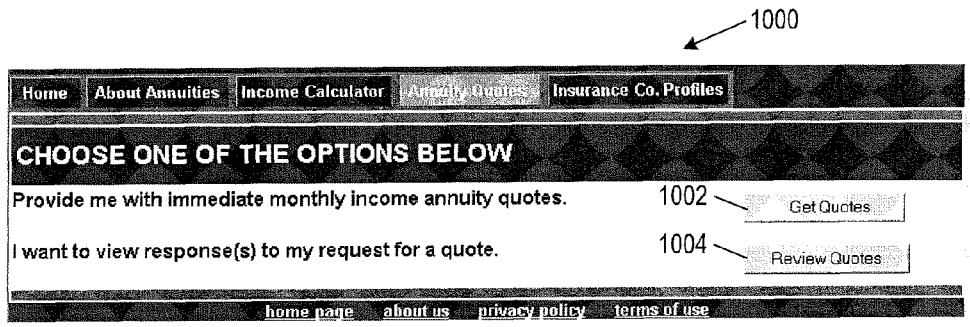
FIG. 10 illustrates an exemplary quote initiation user interface screen from which an annuity purchaser can initiate a quote solicitation or review received quotes.

The link bar 706 and/or the toolbar 704 shown in FIG. 7 also include links to initiate the quote solicitation process. Through selection of the appropriate buttons or links, such as the "Annuity Quotes" button/link 802A/802B shown in FIG. 8, a quote initiation user interface screen 1000 is presented as shown in FIG. 10. From this screen 1000 the user can select the "Get Quotes" button 1002 or the "Review Quotes" button 1004. The "Review Quotes" button 1004 is used after the annuity purchaser has submitted quote requests and wants to review quotes received from the annuity providers in response to the quote requests. The "Get Quotes" button 1002 is selected when the user wants to initiate the process of soliciting quotes from various annuity providers.

Figure 11:
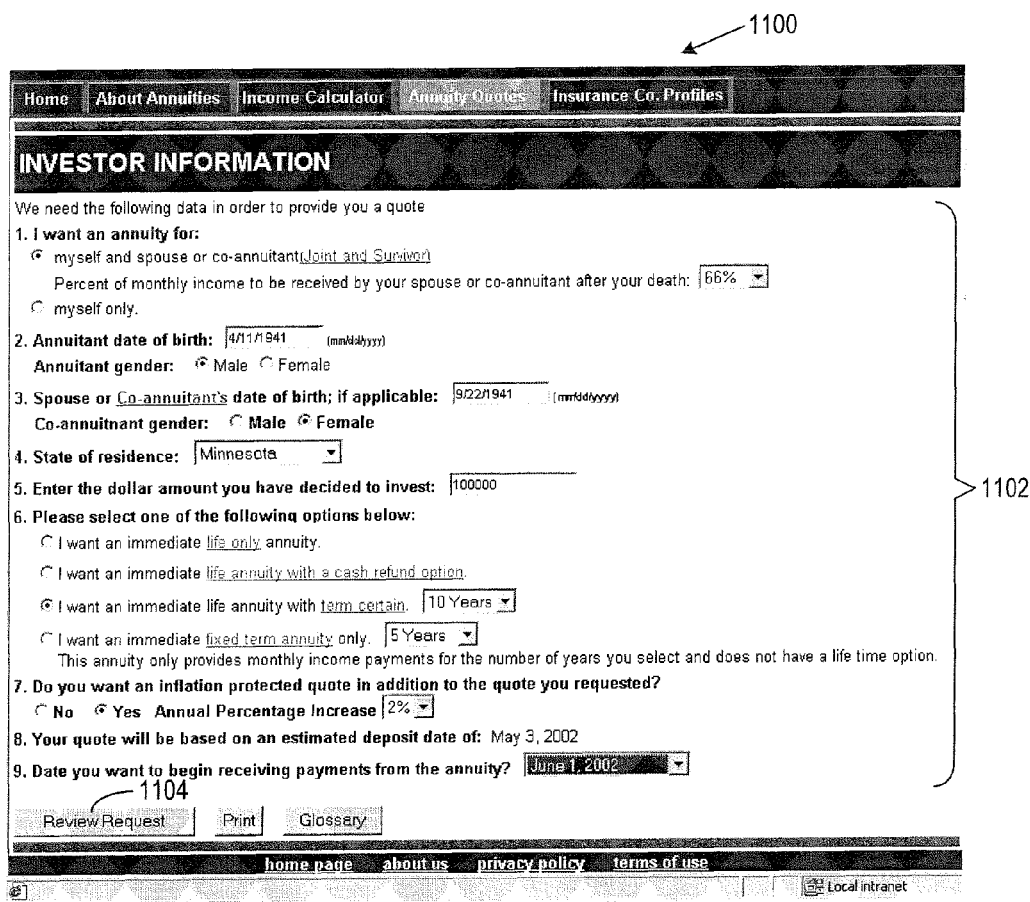
FIG. 11 illustrates a quote request entry screen that is presented upon the annuity purchaser's initiation of the quote solicitation process.

FIG. 11 illustrates a quote request user interface screen 1100 that is presented when the annuity purchaser initiates the quote solicitation process. For example, selection of the "Get Quotes" button 1002 shown in FIG. 10 or the "Get Quotes" button 810 shown in FIG. 8 will present the quote request user interface screen 1100. The quote request user interface screen 1100 provides an annuity information entry area 1102 from which the annuity purchaser can enter the information required for the annuity providers to calculate and submit an annuity quote. The information entered by the user may include, for example, whether the annuity is for an individual or an individual/spouse combination, the percent of monthly income to be received by a surviving spouse, the birth date and gender of the annuitant (or annuitant/spouse combination if applicable), the state of residence, the dollar amount that will be invested and the estimated deposit date, the type and term of annuity desired, whether inflation protection is desired, the date in which payments from the annuity are to begin, etc.

It should be noted that because the individuals themselves purchase the annuity rather versus through a plan where annuities are purchased as part of a unisex group, pricing on the annuity placement platform is gender distinct rather than unisex pricing. This is important because in plan-based annuity options, if the individual is a male, his annuity will be priced using unisex mortality rates which is unfavorable to him.

Figure 12:
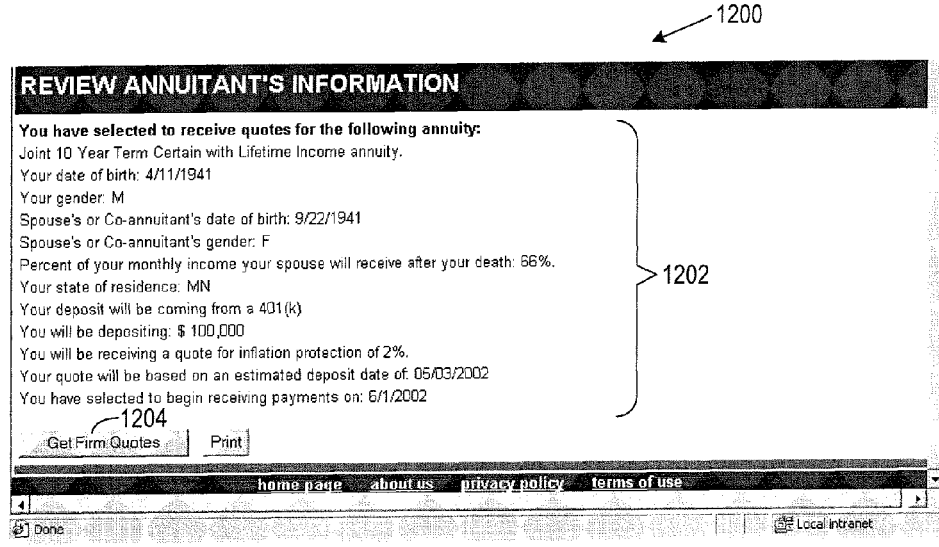
FIG. 12 is an exemplary embodiment of a user interface screen to allow the annuity purchaser to review the quote request information.
Figure 13:
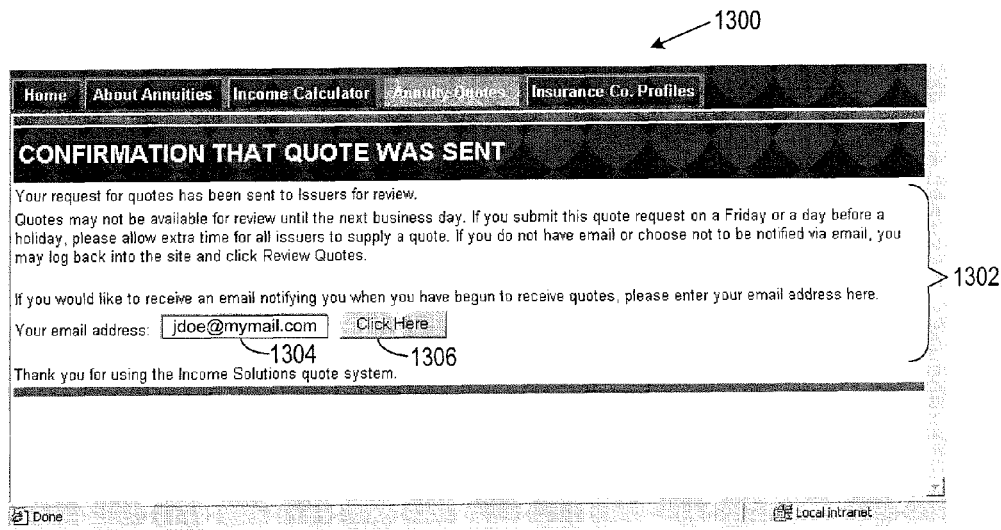
FIG. 13 illustrates an exemplary confirmation screen confirming the annuity purchaser's quote solicitation.

When this information has been entered by the user, the request can be reviewed by selecting the "Review Request" button 1104, which presents the user interface screen 1200 shown in FIG. 12. The review field 1202 reiterates the information entered by the user via the quote request user interface screen 1100 (FIG. 11) so that the user can verify the information. If the information appears accurate, the user can select the "Get Firm Quotes" button 1204 to submit the quote request to the various annuity providers authorized to receive the quote request. Upon submission of the quote request, a confirmation screen 1300 is presented as shown in FIG. 13. This user interface screen 1300 includes confirmation and instructional information in display area 1302, such as a confirmation that the quote request was submitted, and instructions as to when the annuity purchaser can expect to receive quotes from the annuity providers. The display area 1302 may also include one or more mechanisms to allow the purchaser to be notified upon return of one or more quotes from the annuity providers. For example, an e-mail field 1304 may be provided to enter the purchaser's e-mail address, which is submitted by selection of button 1306. At this point, the annuity purchaser waits to receive the quotes that he/she requested from the various annuity providers.

The annuity providers to whom the quote requests were directed then become involved with the transaction via the annuity placement program. In one embodiment, the annuity providers are notified that a quote request is pending, thereby prompting the annuity providers to react by accessing the annuity placement program. In another embodiment, no direct notification is provided to the annuity providers, but rather the annuity providers continuously or periodically monitor the annuity placement program to determine whether one or more quote requests are pending.

Figure 14:
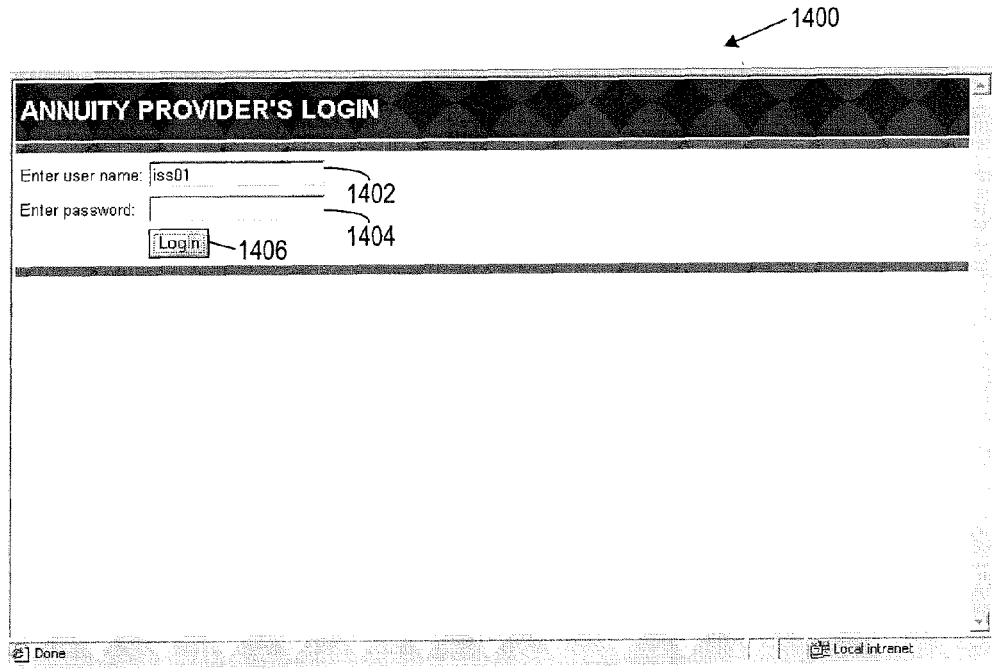
FIG. 14 illustrates an exemplary annuity provider login from which annuity providers can obtain access to the annuity placement program.

The annuity provider accesses a login page, such as the login user interface screen 1400 shown in FIG. 14. The annuity provider can access this page by accessing a predetermined address such as a URL. Upon presentation of the user interface screen 1400, the annuity provider can enter a user identifier in user name field 1402 and a password in password field 1404. Selection of the "Login" button 1406 submits the user identifier and password to the annuity placement program, thereby allowing the annuity provider access to the system, if authorized.

Figure 15:
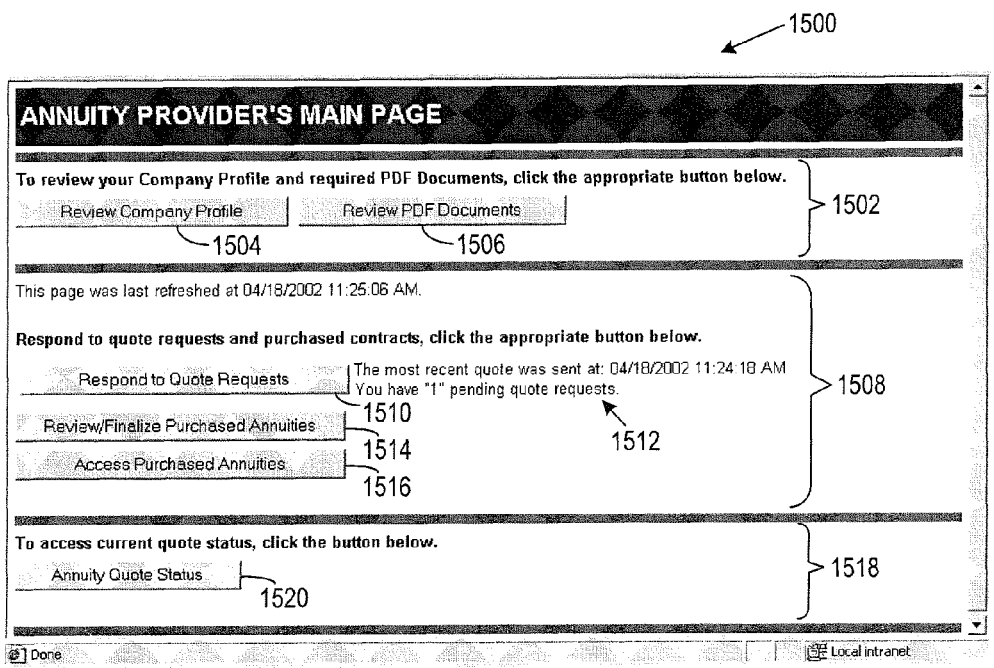

Once logged on, the annuity provider accesses their main user interface page 1500 as shown in FIG. 15. Each annuity provider accesses their own main page 1500, based on the user identifier and password previously provided. The main page 1500 includes, for example, an information area 1502 where the annuity provider can access information such as their company profile and other documents. For example, to review the annuity provider's profile, the "Review Company Profile" button 1504 is selected which presents the annuity provider's profile information that can be reviewed and/or modified. Other documents can be reviewed via selection of the "Review PDF Documents" button 1506. Documentation may be provided in any format, and is not limited to PDF files.

Screen 1500 also includes a quote processing area 1508. This area includes links to allow the annuity provider to respond to quote requests and purchased annuities. For example, a link, button, or other indicator is provided for quote requests. In the illustrated embodiment, the "Respond to Quote Requests" button 1510 serves this purpose. There may be descriptive information 1512 associated with this button 1510, such as information relating to the most recent quote that was submitted, and the number of pending quote requests. Selection of the "Respond to Quote Requests" button 1510 allows the annuity provider to process the pending quote requests. Selection of the "Review/Finalize Purchased Annuities" button 1514 allows the annuity provider to review and finalize annuities that have already been quoted and accepted by annuity purchasers. Selection of the "Access Purchased Annuities" button 1516 allows the annuity provider to review existing annuities that have already been finalized.

Screen 1500 also includes a quote status area 1518, where the annuity provider can access pending quote status. For example, selection of the "Annuity Quote Status" button 1520 allows the annuity provider to determine the status of quotes that were submitted by the annuity provider in response to corresponding quote requests.

The annuity provider initiates the process of responding to pending quote requests by selecting the appropriate buttons, links, etc., such as the "Respond to Quote Requests" button 1510. Upon selection of this button, one or more pending quote requests are presented via the select annuity quote request screen 1600 shown in FIG. 16. In the illustrated embodiment of FIG. 16, a pending quote request is identified by a corresponding link, button, etc., such as button 1602. Selection of button 1602 allows the annuity provider to review (either manually or automatically) the information submitted by the annuity purchaser in the quote request, and also allows the annuity provider to enter the appropriate quote in response to the quote request. FIG. 17 is an exemplary embodiment of a quote management screen 1700 which allows annuity providers to review quote solicitations and provide annuity quotes in response thereto.

Referring to FIG. 17, the exemplary quote management screen 1700 includes a party information area 1702 that includes information regarding the parties to the potential annuity transaction. For example, this information may include the name of the company/annuity provider and the particular record keeper associated with that company. This information may also include the user name of the annuity purchaser who submitted the quote solicitation, as well as the date and time in which the quote solicitation was submitted.

The purchaser quote request area 1704 includes the particulars of the quote request. This information corresponds to the information submitted by the purchaser in the quote request. For example, the information in the purchaser quote request area 1704 includes information submitted by the purchaser via the annuity information area 1102 previously described in connection with FIG. 11. This information includes, for example, whether the annuity is for an individual or an individual/spouse combination, the percent of monthly income to be received by a surviving spouse, the birth date and gender of the annuitant (or annuitant/spouse combination if applicable), the state of residence, the dollar amount that will be invested and the estimated deposit date, the type and term of annuity desired, the origin of the deposit (e.g., a 401(k) account), whether inflation protection is desired, the date in which payments from the annuity are to begin, etc.

From this information, the annuity provider (also referred to as the annuity "issuer") can enter annuity quote information in quote entry area 1706. Within the quote entry area 1706 is the company information field 1708, where one or more information items may be pre-designated by the issuer, such as company name and various company ratings. The quote entry field 1710 allows the annuity provider to enter specific quote data responsive to the purchaser information provided in the purchaser quote request area 1704. This quote information can be entered manually, or automatically via computer calculations using the purchaser information as the calculation input. The quote information entered into the quote entry field 1710 includes monthly (or other time period) income quotes for the annuity type and term requested by the purchaser. For example, in response to purchaser information requesting a quote for a 10-year life annuity based on a $100,000 deposit, a plurality of different annuity options may be provided to the purchaser via the quote entry field 1710, including the monthly income for a 10-year term certain with lifetime income, the monthly income for inflation protection for a 10-year term certain with lifetime income, the monthly income for life only, etc. The annuity provider enters monetary amounts into quantity fields 1712 corresponding to each of these various options. Once entered (either manually or automatically), the quote is submitted. In one embodiment, the quote is submitted by selecting the "Submit Quote" button 1714.

Figure 18:
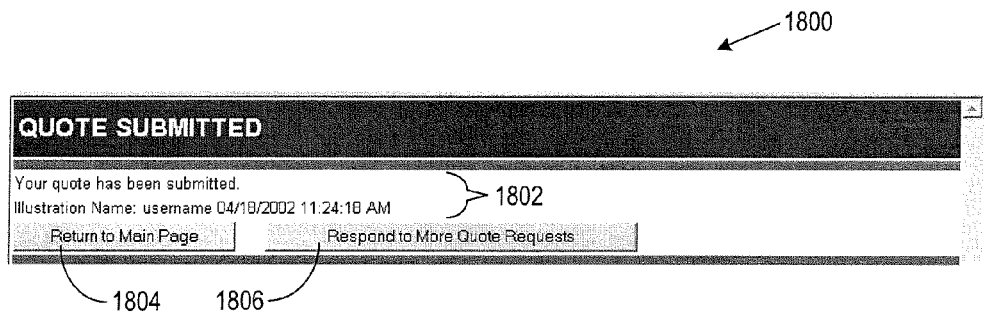
FIG. 18 illustrates an exemplary embodiment of a submitted quote screen which may be presented to the annuity provider upon submission of a quote.

The submitted quote screen 1800 shown in FIG. 18 is presented to the annuity provider upon submission of the quote. This user interface screen 1800 includes a submitted quote information area 1802, which includes information such as a confirmation that the quote has been submitted, as well as the user name of the annuity purchaser and quote request date/time. Other information may be provided in the submitted quote information area 1802 as well. The annuity provider can further select additional links or buttons to navigate through the annuity placement web site, such as by selecting the "Return to Main Page" button 1804, or by selecting the "Respond to More Quote Requests" button 1806 to process additional quote requests.

Figure 19:
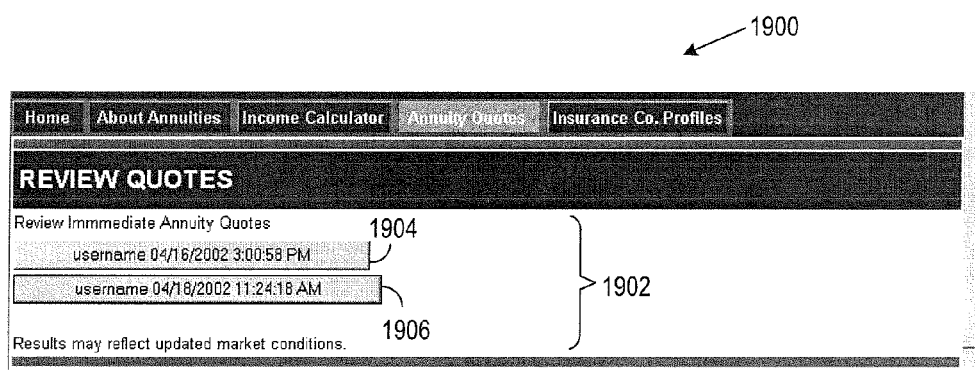
FIG. 19 is an exemplary embodiment of a user interface screen which allows the annuity purchaser to review the quotes submitted by the annuity providers.

Either through notification to the purchaser or through purchaser monitoring, the annuity purchaser can review quotes submitted by the annuity providers in response to quote requests. FIG. 19 is an exemplary embodiment of a user interface screen 1900 which allows the annuity purchaser to review the quotes submitted by the annuity providers. As indicated above, the purchaser may be notified directly of receipt of a quote, such as via e-mail, fax, telephone call, pager, etc. Alternatively, the purchaser may monitor the annuity placement web site to determine when quotes have been submitted in response to the purchaser's quote request(s). The screen 1900 is presented to the annuity purchaser through navigation to the appropriate screen, such as via selection of the "Review Quotes" button 1004 described in connection with FIG. 10.

Associated with screen 1900 is a quote selection area 1902, where instructional information is provided, and where annuity provider quotes are identified. For example, one or more quote buttons 1904, 1906 are provided, each of which corresponds to a set of quotes that are responsive to the purchaser's previously submitted quote requests. Selection of a first quote button 1904 allows the purchaser to review quotes associated with a quote request submitted at a first date/time, selection of a second quote button 1906 allows the purchaser to review quotes associated with a quote request submitted at a second date/time, and so forth.

Figure 20:
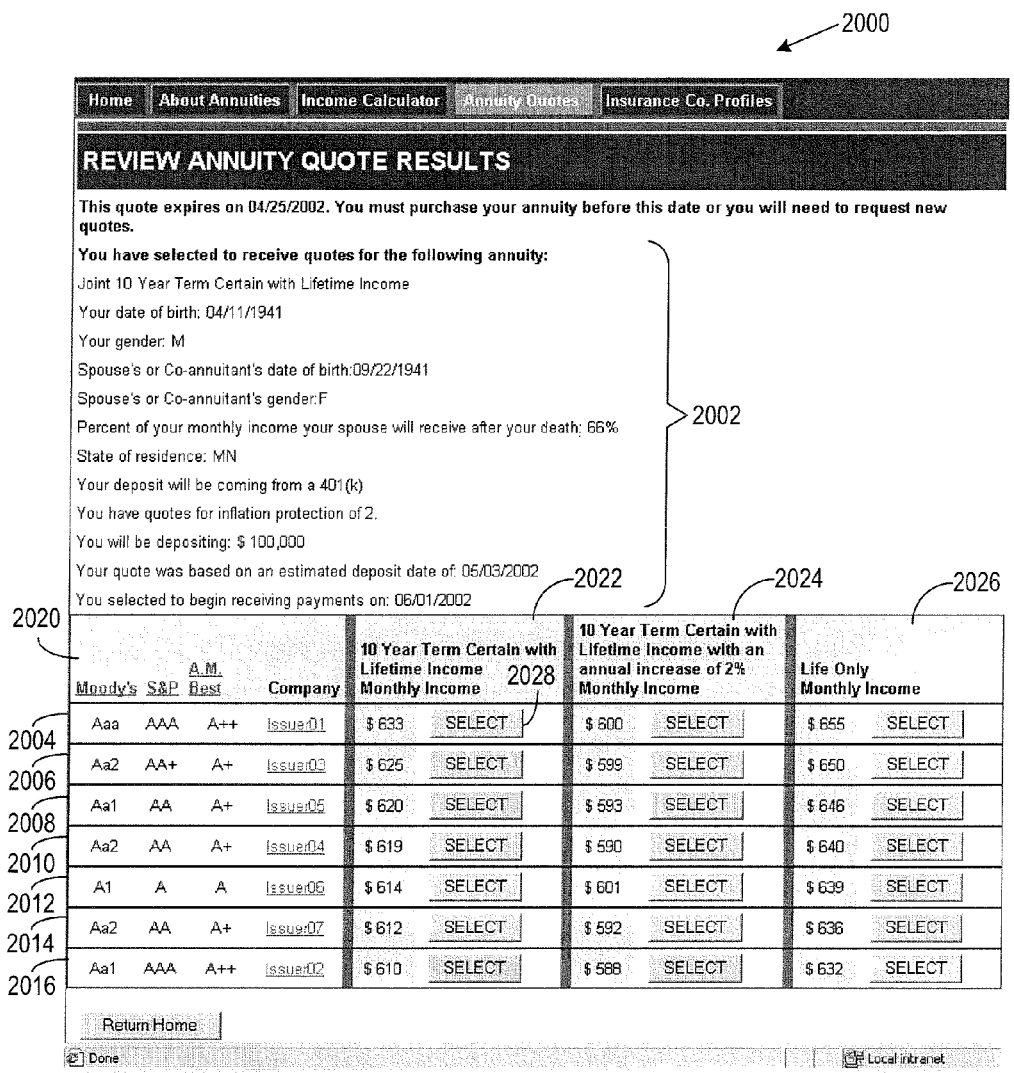
FIG. 20 illustrates an exemplary annuity quote selection screen that is presented to the annuity purchaser to facilitate the purchaser's selection of a quote.

Upon selection of a quote button (or other linking mechanism), the annuity purchaser is presented with the annuity quote selection screen 2000, an exemplary embodiment of which is provided in FIG. 20. The information originally submitted by the annuity purchaser in making the quote solicitation is presented in the purchaser information field 2002, and in one embodiment substantially corresponds to the information originally entered by the purchaser in field 1102 of FIG. 11.

The annuity quote selection screen 2000 also includes a list of one or more annuity quotes from one or more annuity providers. For example, each of the rows 2004, 2006, 2008, 2010, 2012, 2014, 2016 correspond to a different annuity quote responsive to the purchaser's previously submitted quote solicitation. More particularly, row 2004 corresponds to a first issuer, referred to herein as Issuer01. Similarly row 2006 corresponds to Issuer03, row 2008 corresponds to Issuer05, row 2010 corresponds to Issuer04, row 2012 corresponds to Issuer06, row 2014 corresponds to Issuer07, and row 2016 corresponds to Issuer02. The company header field 2020 includes column headers such as the company name, as well as one or more credit rating institutions such as Moody's and Standard & Poor's. Each row includes the company name and credit ratings associated with the particular fields in the company header field 2020.

The annuity quote selection screen 2000 also includes the quotes from each of the annuity providers who submitted a quote, and for each of the various quote options. For example, the annuity provider entered monetary amounts into quantity fields 1712 of FIG. 17 which corresponded to each of these various annuity options. These various annuity options are presented in each of the column fields 2022, 2024, 2026.

Additional or fewer fields may be presented, depending on the number of annuity options that were quoted.

Field 2022 corresponds to, for example, the quote entered by the annuity provider in a first field 1712 (see FIG. 17) for monthly income for a 10-year term certain with lifetime income. Each of the annuity provider's quotes for this annuity option is presented to the annuity purchaser in field 2022. For example, for Issuer01 in row 2004, the monthly income quoted by Issuer01 for a 10-year term certain with lifetime income is $633. A corresponding quote is provided in field 2022 for each of the various annuity providers who provided a quote for this annuity option. The annuity purchaser can select a winning quote by selecting a link, button, etc. associated with the winning quote. Similarly, field 2024 corresponds to, for example, the quote entered by the annuity provider in a second field 1712 (see FIG. 17) for monthly income for inflation protection for a 10-year term certain with lifetime income. Each of the annuity provider's quotes for this annuity option is presented to the annuity purchaser in field 2024. For example, for Issuer01 in row 2004, the monthly income quoted by Issuer01 for monthly income for inflation protection for a 10-year term certain with lifetime income is $600. A corresponding quote is provided in field 2024 for each of the various annuity providers who provided a quote for this annuity option. Again, the annuity purchaser can select a winning quote by selecting a link, button, etc. associated with the winning quote. A third field 2026 corresponds to the quote entered by the annuity provider in a third field 1712 (see FIG. 17) for monthly income for life only. Each of the annuity provider's quotes for this annuity option is presented to the annuity purchaser in field 2026. For example, for Issuer01 in row 2004, the monthly income quoted by Issuer01 for monthly income for life only is $655. A corresponding quote is provided in field 2026 for each of the various annuity providers who provided a quote for this annuity option. Again, the annuity purchaser can select a winning quote by selecting a link, button, etc. associated with the winning quote.

Using the annuity quote selection screen 2000, the annuity purchaser can conveniently compare the various quotes from the various annuity providers, and make a decision as to which annuity option and annuity provider will be selected. The companies (i.e., rows 2004-2016) can be arranged in any desired manner, such as by highest quote to lowest, by credit rating, by issuer name, etc. In one embodiment of the invention, the rows 2004-2016 are arranged from the highest average quotes to the lowest average quotes, thereby allowing the annuity purchaser to quickly identify the quotes that will provide the highest income.

Once the purchaser has made a decision, he/she selects the appropriate selection link/button. For example, the annuity purchaser may decide to select the quote from Issuer01 for the 10-year term certain with lifetime income having a monthly income of $633. To make this selection, the purchaser selects the "Select" button 2028. Selection of this button presents the confirmation screen 2100 shown in FIG. 21, which displays the information originally submitted by the annuity purchaser in making the quote solicitation in information area 2102. Also presented in confirmation screen 2100 is the selected annuity information in selected annuity area 2104, which includes information such as the type and term of annuity selected, the issuing company, the various credit ratings of the company, and the monthly income to be generated by the selected annuity. An agreement data entry area 2106 is also presented, where the annuity purchaser enters information such as the purchaser's name, address and other contact information, and a re-verification of the deposit amount. Upon entry of this information, the annuity purchaser selects the "Purchase" button 2108, which effects the purchase of the particular annuity.

Upon purchasing the annuity, a purchase confirmation screen 2200 shown in FIG. 22 is presented in accordance with one embodiment of the invention. The confirmation screen 2200 serves as a confirmation and agreement generation page. Confirmation text (or sound, graphics, etc.) is presented in confirmation area 2202, and further instructions are provided in instruction area 2204. These further instructions may, for example, request that the annuity purchaser print the page, sign and date the form in the signature block 2206, and distribute original and/or copies of the executed agreement page to the annuity provider, benefits department of the plan sponsor, etc. Other information reiterating the purchaser information and annuity information may be provided in the annuity information area 2208.

As described above, a problem facing today's insurance/annuity industry deals with the general availability of annuities to individuals, even where those individuals are involved with a defined benefit plan provided by their employers or other plan sponsor. Presently, insurance companies generally write group contracts for facilitating annuity purchases by plan participants to the corporate plan sponsor or to an agent of the plan appointed by the plan. A plan that can offer group annuities to its participants must have language in the plan document that allows for this distribution option. Historically all pension funds (defined benefit plans) allowed for this option, and plan sponsors were inclined to also provide it in their 401(k) plans. The majority of group annuity contracts were written to defined benefit plans. However, in more recent years, plan sponsors began to eliminate the annuity option from their existing defined contribution plans, and it was seldom included in any new plan creation. Corporate plan sponsors had several problems with providing the option. Complying with the DOL guidelines for annuity selection meant increased time, high-level administration, and increased fiduciary liability for the plan sponsors. Plan sponsors felt that if the process did not comply with 95-1 and was not fully documented to prove it, the company could be exposed to significant future liability. Additionally, in order to actually comply with 95-1, plan sponsors had to move away from the common practice of allowing the insurance company(s) in which they did the most business with handle the annuity requests by participants, with little concern for competitive pricing, etc. As a result, only a relatively small percentage of current defined contribution plans still have an annuity option. Therefore, it is most often the case that plan sponsors do not provide an annuity option, and plan sponsors are reluctant to institute such an option in new plans due to cost and liability issues.

The present invention solves these problems by making the annuity placement model of the present invention universally available and fair to all participants in any retirement plan. This is done by creating an acceptable discretionary group to be the contract holder (thereby eliminating the plan sponsors' involvement), and/or effecting the annuity purchase after a participant has taken a lump sum disbursement or has elected an IRA rollover option from the plan. In either case, the resulting structure does not rely on the plan sponsor or the plan document. This platform provides all participants equal access to annuities if their state's insurance law recognizes discretionary groups, and/or if a participant is involved in a qualified plan where a rollover can be effected.

Figure 23:
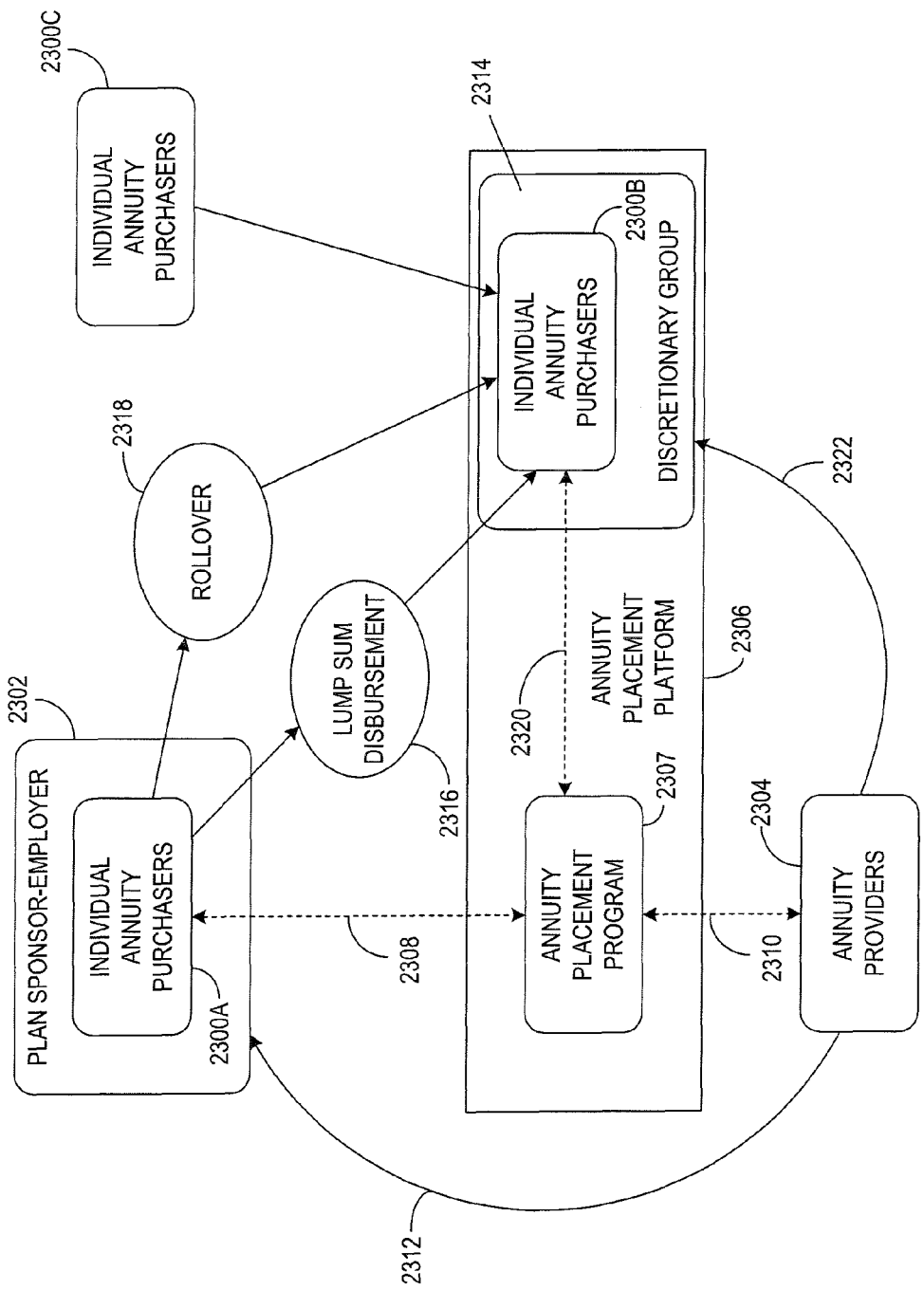
FIG. 23 is a block diagram illustrating an exemplary methodology in accordance with the present invention whereby all participants are afforded equal access to annuities, and where plan sponsors/employers can remain uninvolved in annuities where the plan does not provide for an annuity option.

FIG. 23 is a block diagram illustrating an exemplary methodology in accordance with the present invention whereby all participants are afforded equal access to annuities, and where plan sponsors/employers can remain uninvolved in annuities where the plan does not provide for an annuity option. Individuals 2300A desiring an annuity who currently have "qualified," defined benefit plans through a plan sponsor/employer 2302 can obtain an annuity through any one of a number of manners. Generally, a "qualified plan" as used herein refers to an employee benefit plan that meets the regulatory requirements of ERISA and the Internal Revenue Code and thereby qualifying the plan's sponsor and the plan's participants for certain tax benefits and tax deferrals. Alternatively, a non-qualified plan is generally a pension, profit sharing, or other deferred compensation arrangement that does not meet the qualification requirements of the IRC, such as the provisions on nondiscrimination, eligibility, funding, and vesting. If the plan document includes language allowing the offering of group annuities to its participants, then the individual annuity purchasers 2300A can obtain an annuity with an annuity provider 2304 using the annuity placement program 2307 in the manner described above and as represented by dashed lines 2308, 2310. A certificate is then issued by the annuity provider to the individual annuity purchaser 2300A by way of the plan as the group contract holder, as depicted by line 2312.

If the plan document does not provide for such an option, the individual purchasers 2300A become associated with a discretionary group 2314, as depicted by the individual purchasers 2300B. This discretionary group 2314 is an entity such as a corporation that holds a master group contract for each of the annuity providers participating in the annuities placement platform. For example, if there are seven annuity providers participating in the annuity placement platform, there will be seven master group contracts held by the discretionary group 2314. Thus, the annuity placement platform facilitates establishment of a discretionary group to whom participating annuity providers write a master group contract to. In one embodiment of the invention, these contracts are already in effect when the annuity purchasers send quote requests and obtain quotes from the respective annuity providers. These master group contracts allow the discretionary group to be the contract holder for any immediate annuity that any individual wants to purchase via the annuity placement platform.

When the annuity purchaser actually purchases an annuity from an annuity provider via the annuity placement program 2307, the annuity provider issues a certificate of participation to the annuitant under the master group contract of the annuity provider. The certificate reflects the annuity as customized for the particular annuity purchaser. So the annuity purchaser's individual terms are complied with, albeit under the umbrella of the group vehicle.

Thus, in a preferred embodiment of the invention, the master group contract for each of the participating annuity providers is written to the discretionary group and is in place prior to annuity purchases via the annuity placement program. The master group contract facilitates individual purchases under group pricing terms, and serves as an institutional product that allows individuals to have the benefit of group pricing.

The discretionary group 2314 is part of the annuities placement platform of the present invention, the two of which may or may not be held by a common entity. Associating the individuals with the discretionary group can be effected, for example, through facilitation of the annuity purchase after the individual annuity purchasers 2300A have taken a lump sum disbursement 2316 from a defined benefit plan, or have elected a rollover 2318 option from the plan which is a mandatory distribution option for all defined contribution plans. In this manner, the individual annuity purchasers 2300B can obtain an annuity through an annuity provider 2304 using the annuity placement program 2307 in the manner described above and as represented by dashed line 2320. A certificate is issued by the annuity provider to the individual annuity purchaser 2300B, where this certificate is issued under the terms of the master group contract previously in place and written by the annuity provider to the discretionary group 2314, as depicted by line 2322.

Other individual annuity purchasers 2300C, such as those who may have non-qualified contributions in which to purchase an annuity, can also gain access to the annuity placement platform 2306 to purchase an annuity. For example, an individual 2300C may have a financial planner or other financial consultant who participates in the annuity placement platform of the present invention. A number of different fiduciaries may participate in the annuity placement platform, including financial planners, consultants, accountants, record keepers, attorney associations who handle structured settlements, or any other analogous financial consultant. In this manner, individuals 2300C having an otherwise "non-qualified" contribution can, through their participating advisors, service providers, or other representatives, become part of the discretionary group and purchase annuities as previously described Annuity providers will have a master group contract in place and written to the group contract holder (i.e., discretionary group) for those individuals 2300A who are associated with a "qualified" contribution, as well as a master group contract written to the group contract holder to account for those individuals 2300C who have non-qualified contributions to apply to an annuity.

The end result of the methodology presented in FIG. 23 is a structure that does not rely on the plan sponsor or the plan document. What makes the individuals a "group" is their affiliation to the annuity placement platform rather than being members of one plan. This, coupled with the fact that the individual himself/herself is selecting the annuity, thereby eliminates the need for unisex pricing as required under rules relating to annuities offered under a plan to those plan participants.

A corporation or other appropriate legal entity may be established to serve as the discretionary group contract holder. A state whose insurance laws facilitate such a discretionary group contract holder may be selected as the state of incorporation. More particularly, the selected state of incorporation or establishment should be one where establishing such a discretionary group contract holder complies with special purpose corporation rules and its state insurance definition of acceptable discretionary groups. Participating insurance companies will amend their contracts to allow for discretionary groups as acceptable contract holders, and allow for IRA money to be deposited from the individuals IRA account rather than from the plan.

The annuity placement platform of the present invention levels the playing field and provides all participants equal access, if their residence state's insurance law is among the majority of states whose insurance law accepts discretionary groups. However, because the contracts utilized in connection with the present invention allow for both discretionary groups as contract holders and accept IRA rollover dollars, any participant in any qualified plan can purchase a group annuity or institutionally priced annuity through the annuity placement platform. The individual annuity purchaser's plan sponsor is not party to the program and does not dictate insurance company participants. The individual plan participant controls the quote process, and can ensure that his/her purchase is competitively quoted, therefore maximizing the monthly income ultimately received. Individuals also receive gender distinct pricing, which is neutral to women, but is quite important in the case of male annuitants.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method for facilitating annuity contract quoting between annuity purchasers and annuity providers; comprising:
   receiving, by a server computing system, an electronic annuity quote invitation from an annuity purchaser computing system on behalf of an annuity purchaser;
   electronically dispatching the electronic annuity quote invitation from the server computing system to annuity provider computing systems of designated annuity providers to prompt the designated annuity providers to furnish the annuity quote at a group rate for the annuity purchaser who is not otherwise a member of a group;
   assembling, by the server computing system, electronic annuity quote responses provided by the annuity provider computing systems, in a presentation facilitating comparative analysis of at least income between the electronic annuity quote responses;
   sending, by the server computing system, the electronic annuity quote responses to the annuity purchaser computing system in response to the electronic annuity quote invitation;
   receiving, by the server computing system, a highest income-generating electronic annuity quote response selected by the annuity purchaser computing system from the electronic annuity quote responses sent; and
   electronically notifying the annuity provider computing system that provided the highest income-generating electronic annuity quote response that the annuity purchaser is requesting to purchase an annuity from the designated annuity provider associated with the annuity provider computing system that provided the highest income-generating electronic annuity quote response at the group rate and at terms provided in the highest income-generating electronic annuity quote response.

2. The method of claim 1, wherein receiving an electronic annuity quote invitation comprises receiving personal and financial information from the annuity purchaser computing system at a web-based annuity placement program hosted by the server computing system and operable on the annuity purchaser computing system.

3. The method of claim 1, wherein electronically dispatching the electronic annuity quote invitation comprises transmitting the electronic annuity quote invitation from the annuity purchaser computing system to the annuity provider computing systems of the designated annuity providers via a web-based annuity placement program hosted by the server computing system and operable on the annuity purchaser computing system and on the annuity provider computing systems.

4. The method of claim 1, wherein sending electronic annuity quote responses comprises receiving, from the annuity provider computing systems, annuity income information at a web-based annuity placement program hosted by the server computing system and operable on the annuity provider computing systems, and sending, by the server computing system, the electronic annuity quote responses to the annuity purchaser computing system on behalf of the annuity provider computing systems.

5. The method of claim 1, further comprising providing, by the server computing system, a user interface to the annuity purchaser computing system to receive annuity purchaser designation of one or more of the annuity providers in which an annuity quote is desired.

6. The method of claim 5, wherein providing a user interface to receive annuity purchaser designation comprises providing a user interface to receive manual annuity purchaser designation of the annuity providers in which an annuity quote is desired.

7. The method of claim 5, wherein providing a user interface to receive annuity purchaser designation comprises providing a user interface to receive default designations of predetermined ones of the annuity providers in which an annuity quote is desired.

8. The method of claim 7, wherein providing a user interface to receive default designations of predetermined ones of annuity providers comprises receiving designations of at least a portion of the annuity providers who have been registered for use of an annuity placement program hosted by the server computing system that facilitates the annuity contract quoting between the annuity purchasers and the annuity providers.

9. The method of claim 1, further comprising notifying, by the server computing system, the annuity provider computer systems of the annuity providers not associated with the highest income-generating electronic annuity quote responses that they failed to be selected by the annuity purchaser computing system as the highest income-generating electronic annuity quote response.

10. A system for facilitating annuity contract quoting between annuity purchasers and annuity providers; comprising:
    at least one annuity purchaser computing system;
    a plurality of annuity provider computing systems;
    a server computing system configured to:
       receive an electronic annuity quote invitation from an annuity purchaser computing system on behalf of an annuity purchaser and directed to the plurality of annuity providers;
       electronically dispatch the electronic annuity quote invitation to the annuity provider computing systems to prompt the annuity providers to respectively furnish the annuity quotes at a group rate for the annuity purchaser who is not otherwise a member of a group;
       assemble electronic annuity quote responses provided by the annuity provider computing systems, in a presentation facilitating comparative analysis of at least income between the electronic annuity quote responses;
       sends the electronic annuity quote responses to the annuity purchaser computing system in response to the electronic annuity quote invitation;
       receive a highest income-generating electronic annuity quote response selected by the annuity purchaser computing system from the electronic annuity quote responses sent; and
       electronically notify the annuity provider computing system that provided the highest income-generating electronic annuity quote response that the annuity purchaser is requesting to purchase an annuity from the annuity provider associated with the annuity provider computing system that provided the highest income-generating electronic annuity quote response at the group rate and at terms provided in the highest income-generating electronic annuity quote response.

* * * * *